US011558480B2

(12) United States Patent
Petersen et al.

(10) Patent No.: US 11,558,480 B2
(45) Date of Patent: Jan. 17, 2023

(54) TRACKING CONTENT USE VIA SOCIAL MEDIA

(71) Applicant: Comcast Cable Communications Management, LLC, Philadelphia, PA (US)

(72) Inventors: Christian Petersen, Sunnyvale, CA (US); Adam Hertz, San Francisco, CA (US); John Dixon, Philadelphia, PA (US); Sam Schwartz, Philadelphia, PA (US); Preston Smalley, Danville, CA (US)

(73) Assignee: COMCAST CABLE COMMUNICATIONS MANAGEMENT, LLC, Philadelphia, PA (US)

( * ) Notice: Subject to any disclaimer, the term of this patent is extended or adjusted under 35 U.S.C. 154(b) by 299 days.

(21) Appl. No.: 14/333,296

(22) Filed: Jul. 16, 2014

(65) Prior Publication Data

US 2016/0021202 A1   Jan. 21, 2016

(51) Int. Cl.
*H04L 67/50* (2022.01)
*G06Q 30/02* (2012.01)
*G06Q 50/00* (2012.01)

(52) U.S. Cl.
CPC ....... *H04L 67/535* (2022.05); *G06Q 30/0201* (2013.01); *G06Q 30/0242* (2013.01); *G06Q 50/01* (2013.01)

(58) Field of Classification Search
CPC ........ H04L 67/22; H04L 67/535; G06Q 30/02
USPC ............... 709/204, 224; 705/14.42
See application file for complete search history.

(56) References Cited

U.S. PATENT DOCUMENTS

| 7,680,882 B2 | 3/2010 | Tiu, Jr. et al. |
| 8,863,158 B1 | 10/2014 | Lewis et al. |
| 9,633,124 B2 | 4/2017 | Peterson et al. |
| 2002/0138619 A1* | 9/2002 | Ramaley .......... H04L 29/06027 709/226 |

(Continued)

FOREIGN PATENT DOCUMENTS

| EP | 1193976 A2 | 4/2002 |
| WO | WO-2008/144528 A2 | 11/2008 |

OTHER PUBLICATIONS

Crowell (http://tubularinsights.com/video-heatmap/, published on Aug. 6, 2009, accessed on Feb. 20, 2016).*

(Continued)

*Primary Examiner* — Joon H Hwang
*Assistant Examiner* — Sherman Lin
(74) *Attorney, Agent, or Firm* — Ballard Spahr LLP

(57) ABSTRACT

Provided are methods and systems related to communications between a social media service or provider (e.g., Twitter®, Facebook®) or other resource (e.g., web page) and one or more content providers. In an aspect, provided are methods, comprising receiving user information and a user agnostic identifier, providing an access element configured to provide access to content from a content provider based on the user information and the user agnostic identifier, receiving, from the content provider, a notification indicative of a user interaction with the content based on a user accessing the content, and tracking user behavior based on at least one of the user information, the user agnostic identifier, the access element, and the notification.

26 Claims, 25 Drawing Sheets

(56) References Cited

U.S. PATENT DOCUMENTS

| | | |
|---|---|---|
| 2003/0135553 A1 | 7/2003 | Pendakur |
| 2007/0282987 A1 | 12/2007 | Fischer et al. |
| 2008/0133311 A1 | 6/2008 | Madriz Ottolina |
| 2008/0263610 A1 | 10/2008 | Murray et al. |
| 2009/0164641 A1* | 6/2009 | Rogers ............. G06F 17/30867 709/227 |
| 2009/0254960 A1* | 10/2009 | Yarom ............. G06F 17/30781 725/115 |
| 2009/0265356 A1 | 10/2009 | Hyman et al. |
| 2010/0169159 A1 | 7/2010 | Rose et al. |
| 2011/0029512 A1 | 2/2011 | Folgner et al. |
| 2011/0107369 A1* | 5/2011 | O'Brien ............. G11B 27/034 725/38 |
| 2011/0153412 A1* | 6/2011 | Novikov ............. G06Q 30/02 705/14.42 |
| 2011/0289157 A1 | 11/2011 | Pirnazar |
| 2012/0191804 A1 | 7/2012 | Wright et al. |
| 2012/0303561 A1 | 11/2012 | Sathish |
| 2012/0324122 A1 | 12/2012 | Miles et al. |
| 2013/0007809 A1 | 1/2013 | Hays |
| 2013/0046580 A1 | 2/2013 | Harker et al. |
| 2013/0054693 A1 | 2/2013 | Chennamadhavuni |
| 2013/0072233 A1 | 3/2013 | Sandholm |
| 2013/0073473 A1 | 3/2013 | Heath |
| 2013/0117675 A1 | 5/2013 | Twig et al. |
| 2013/0145426 A1 | 6/2013 | Wright |
| 2013/0173526 A1 | 7/2013 | Wong et al. |
| 2013/0174199 A1 | 7/2013 | Dow et al. |
| 2013/0227612 A1 | 8/2013 | Abboa-Offei |
| 2013/0305287 A1 | 11/2013 | Wong et al. |
| 2014/0115082 A1 | 4/2014 | Korst et al. |
| 2014/0181212 A1* | 6/2014 | Cong ................. G06F 16/9537 709/204 |
| 2014/0229416 A1 | 8/2014 | Bae et al. |
| 2014/0229544 A1 | 8/2014 | Evans et al. |
| 2014/0278896 A1* | 9/2014 | Anand ............... G06Q 30/0246 705/14.32 |
| 2014/0280625 A1 | 9/2014 | Byrd Vallieres de St. Real et al. |
| 2014/0282709 A1 | 9/2014 | Hardy et al. |
| 2014/0304762 A1 | 10/2014 | Puri |
| 2014/0344694 A1* | 11/2014 | Gomersall ............ G06F 3/0481 715/719 |
| 2015/0025977 A1 | 1/2015 | Doyle et al. |
| 2015/0039698 A1 | 2/2015 | Mavalankar |
| 2015/0058957 A1 | 2/2015 | Halliday et al. |
| 2015/0127727 A1 | 5/2015 | Tseng et al. |
| 2015/0169705 A1 | 6/2015 | Korbecki et al. |
| 2015/0245107 A1 | 8/2015 | Klappert et al. |
| 2015/0248410 A1 | 9/2015 | Stickler et al. |

OTHER PUBLICATIONS

"Never Miss—Sky," Sky.com [Online], (Aug. 6, 2015), http://epgservices.sky.com/nevermiss/.

Profis, S. "How to get text message reminders for your favorite TV shows," CNET [Online], (Nov. 21, 2011), http://www.cnet.com/how-to/how-to-get-text-message-reminders-for-your-favorite-tv-shows/.

* cited by examiner

TRACKING CONTENT USE VIA SOCIAL MEDIA

BACKGROUND

Social media allows users to interact with each other in a variety of ways. For example, users can greet, participate in conversations, share links, as well as provide commentary. Some content and types of communication, however, may not available or capable of being linked through social media interfaces. Therefore, for example, users are often unable to provide links to access content or related communication that the user is referencing or commenting upon. Thus, there is a need for more sophisticated methods and systems for providing content and sharing information via social media.

SUMMARY

It is to be understood that both the following general description and the following detailed description are exemplary and explanatory only and are not restrictive, as claimed. Provided are methods and systems related to communications between a social media service or provider (e.g., Twitter®, Facebook®) or other resource (e.g., web page) and one or more content providers. For example, the methods and systems provided can provide an interface element, such as a button, for use in a social media communication (e.g., a tweet, a post, etc. . . . ). The interface element can be associated with an identifier of one or more of, a content item, a user, a provider, and the like. In some aspects, the identifier is user agnostic. The resulting interface element can permit a connection to other content via the social media communication. In an aspect, the methods and systems provided can track and manage notifications related to interactions with content resulting from the use of the interface element and/or identifier.

In an aspect, provided are methods, comprising receiving user information and a user agnostic identifier, providing an access element configured to provide access to content from a content provider based on the user information and the user agnostic identifier, receiving, from the content provider, a notification indicative of a user interaction with the content based on a user accessing the content, and tracking user behavior based on at least one of the user information, the user agnostic identifier, the access element, and the notification.

In another aspect, provided are methods comprising receiving user information and a user agnostic identifier, providing an access element for content based on the user information and the user agnostic identifier, receiving an interaction with the content, and providing a notification of the interaction.

In a further aspect, provided are methods comprising receiving a plurality of requests for content from a plurality of users based on an interface element configured to provide a user agnostic identifier and user information, providing a first access element to a first portion of the plurality of users to access the content from a first content provider, providing a second access element to a second portion of the plurality of users to access the content from a second content provider, and receiving a plurality of notifications indicative of user interactions with the content from at least one of the first content provider and the second content provider.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
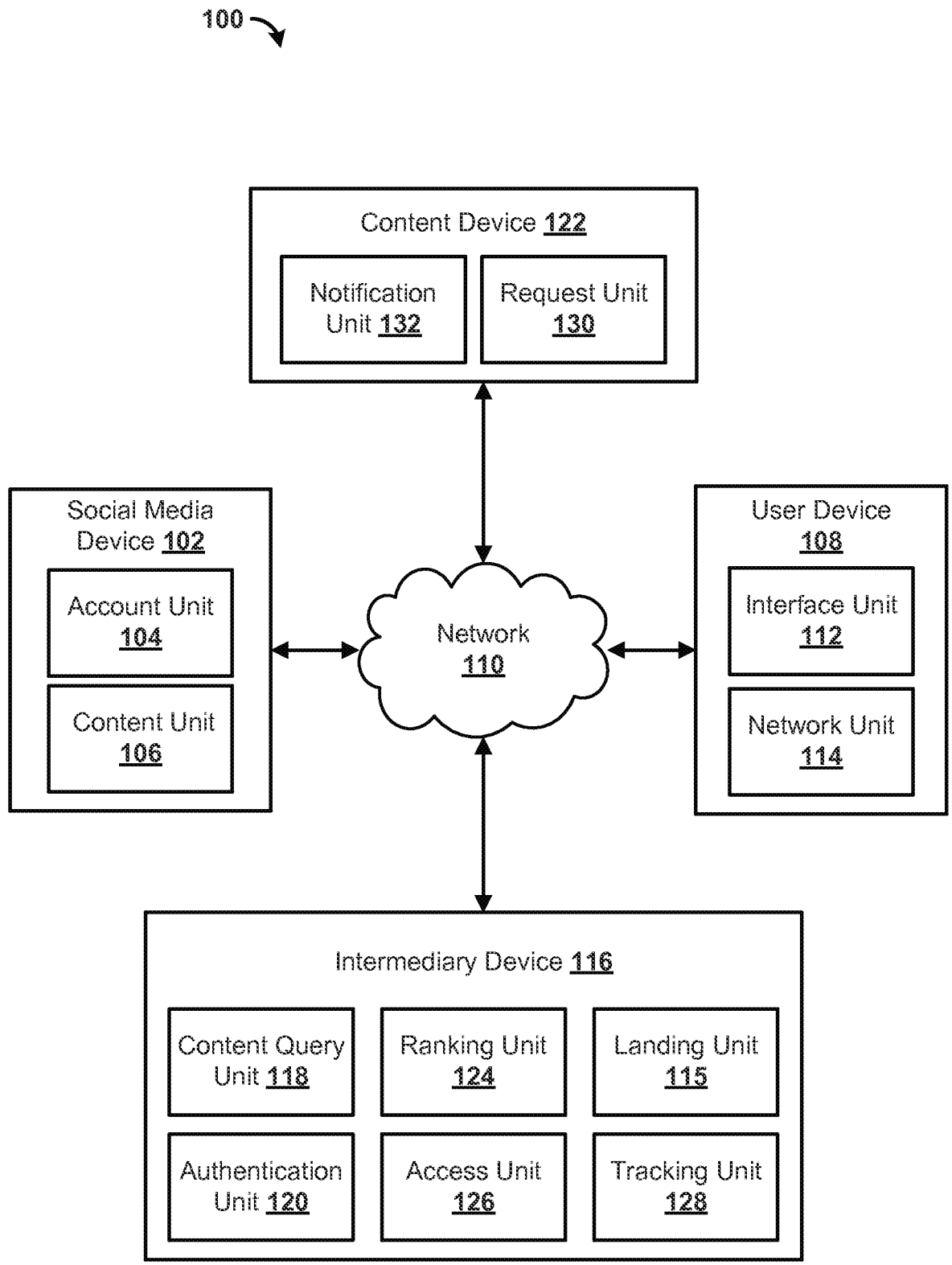
FIG. 1 is a block diagram of an example system for implementing one or more features of the disclosure.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In some aspects, the present disclosure relates to communications between a social media service or provider (e.g., Twitter®, Facebook®) or other resource (e.g., web page) and one or more content providers. The social media provider (e.g., social media server) allows for users to link to content in a variety of ways through an interface element, such as a button (e.g., user-selectable button rendered on a graphical user interface, animated button, picture associated with an action or link). Any interface element can be used, for example, a button labeled "See It!" For example, the button can be provided with a social media post, such as tweet or a Facebook post. When a user posts a message, such as a tweet, the user can also post a link to a landing page at an intermediary device. The social media server can recognize the link (e.g., based on metadata on the landing page) and provide the interface element with the message, e.g., a tweet. As another example, the social media server can suggest adding the interface element or automatically add the interface element based on natural language processing performed on the tweet. The interface element can be a user-agnostic interface element indicative of a content item, such as a television show. When a user (e.g., user who posts the message, or other user) clicks on the interface element, the interface element can be converted to an interface element specific to the user. For example, the interface element can capture and provide user information and/or content information to an intermediary device, such as one or more intermediary servers.

After receiving the user information and/or content information, the one or more intermediary servers can track this information and its association with the interface element. The intermediary server can also implement a protocol used between a variety of content providers and users. For example, the protocol can allow the intermediary server to retrieve or create specific uniform resource locators (URLs) to content relevant to the interface element. The interface element may be relevant to several different pieces of content accessible to the user from different services. Thus, the intermediary server and/or the content provider can provide the relevant content based on timing information associated with the button (e.g., or other interface element) as well as other information, such as user information. For example, the intermediary server can provide a link to live content if the content is currently playing, or a link to recorded content. The intermediary server can also capture and report information related to various viewership rating metrics (e.g., number of views in 3 days, numbers of views in 7 days) used for making advertising and other content and network related decisions. In one aspect, content can be provided based on how the viewing of the content will affect one or more viewership rating metrics. For example, if a viewership rating metric would be increased by providing a recording from 2 days ago instead of a live show, then the recording can be provided.

The intermediary server can provide a variety of content options to the user, and when the user clicks on the relevant URL, the user can access the content directly from the user device or from another user device, such as a smart phone, tablet, or television. The intermediary server can log that the user has accessed the content via the content provider. The protocol also allows for content providers to send information relevant to the transaction back to the intermediary server. For example, when the user stops, pauses, tunes away, clicks a link, or otherwise interacts with the content, then the content provider can provide information about this event to the intermediary server.

FIG. 1 is a block diagram illustrating an example system 100 for providing content. Those skilled in the art will appreciate that the present methods may be used in systems that employ both digital and analog equipment. One skilled in the art will appreciate that provided herein is a functional description and that the respective functions can be performed by software, hardware, or a combination of software and hardware. In an exemplary embodiment, the methods and systems disclosed can be located within one or more social media device, content device, user device, and intermediary server described herein.

In one aspect, the system 100 can comprise a social media device (e.g., and/or social media network) 102. The social media device 102 can be configured to provide content, such as social media information to a plurality of users. Social media information can comprise information shared between and indicative of user interactions with a social media network. For example, social media information can comprise messages, posts, pictures, video, text, relationship data, a plurality of interactions between users, and/or the like. For example, the social media device 102 can comprise an account unit 104 configured to manage accounts for the plurality of users. For example, the account unit 104 can comprise a database comprising user account information, such as login credentials, user history, user preferences, user identifiers, and the like. For example, each user can be associated with a corresponding unique user identifier. Furthermore, groups of users can be associated with group identifiers.

In one aspect, the social media device 102 can comprise a content unit 106 configured to provide social media information and/or other content (e.g., other audio, video, text, and services provided to users) to one or more users. For example, the social media information can comprise messages, posts, pictures, video, text, relationship data, a plurality of interactions between users, and/or the like. The social media information can be displayed as one or more social media feeds. In one aspect, the content unit 106 can be configured to provide user interface information to the one or more users. For example, the user interface information can comprise computer readable code representative of a variety of user interface elements, such as buttons, windows (e.g., posts, status updates), text boxes (e.g., for displaying and entering information), and the like. In one aspect, the user interface information can comprise markup language (e.g. hypertext markup language), scripting language (e.g., javascript), stylesheet language (e.g., cascading style sheets), and the like. In one aspect, the content unit 106 can provide content specific to a particular user (e.g., or many users in other aspects). For example, the content unit 106 can select social media information and/or user interface information associated with a particular user. The content unit 106 can provide the selected social media content and/or user interface information to a requesting user.

In one aspect, the content unit 106 can provide user interface information based on input received from a user. For example, the user interface information can be configured to allow a user to associate a post, message, and/or the like with a content item (e.g., show, episode, movie, program). In response to the input received from the user, the content unit 106 can update the user interface information with an interface element. As an illustration, the user can provide a uniform resource locator (URL) associated with one or more content items. For example, the URL can link to a resource, such as a web page configured to facilitate access to one or more content items. The web page can be a landing page provided by the intermediary device 116. The landing page can provide information about the one or more content items. The landing page can allow a user to access the one or more content items. For example, the landing page can be configured to allow users to login to one or more content providers. The landing page can provide a variety of content options to a user that are relevant to the content item. As a further illustration, the one or more content items can be associated based on one or more common keywords (e.g., descriptive terms). For example, the content items can be grouped according to a genre, actor, actress, director, episodes of show, content channel, sports team, political stance, language, and/or the like.

In one aspect, content unit 106 can be configured to determine if a link or point, such as a URL, links and/or points to a landing page hosted by the intermediary device 116. For example, the content unit 106 can retrieve any type of content, such as the web page referenced by the URL. The content unit 106 can search the web page for information indicating that the web page is a landing page for one or more content items. For example, a landing page can comprise landing page identifiers, such as metatags, indicating that the web page is a landing page for a content item. In one aspect, the landing page identifiers can indicate the title of the content item as well as other information about the content item. The content unit 106 can be configured to retrieve the title and other information about the content item. The content unit 106 can send updated user information to a user, such as an interface element configured to link to the landing page. The interface element can provide the title, images, video, and other information about the content item.

In another aspect, the content unit 106 can select user interface information based on social media information. For example, the content unit 106 can apply natural language processing to social media information. The content unit 106 can associate one or more content items with the social media information based on the natural language processing. For example, the content unit 106 can determine if social media information comments on, describes, makes reference to, or otherwise relates to a content item based on one or more words processed by the natural language processor. As a further example, the social media information can comprise a symbol, such as a hashtag "#," an at "@" sign, and/or the like, followed by a keyword, such as a title of a content item or other identifier (e.g., social media handle). The social media information can comprise one or more keywords (e.g., descriptive terms) relevant to one or more content items, such as a title, program name, actor name, actress name, director, genre, channel indicator, social media handle (e.g., identifier of a user or entity having a social media account), sports team, and/or the like. The content unit 106 can be configured to recognize the symbol and accompanying keyword as well as other words, characters, and the like related to, indicative of, or otherwise associated with one or more content items, a content landing page, and/or the like. If the content unit 106 associates one or more content items with the social media information, the content unit 106 can provide a suggestion to a user to add an interface element to the social media information. The interface element can comprise a link to a landing page configured to facilitate access to the content item and/or related content. As another example, the content unit 106 can automatically select an interface element based on natural language processing of the social media information. The content unit 106 can automatically update the user interface information with the interface element.

In one aspect, the interface element can comprise a button, link, text, image, video, and/or the like. The interface element can reference (e.g., link to) a landing page as described herein. The interface element can comprise or reference text, images, video, and/or the like provided by the landing page. The interface element can reference an associated content item, a group of associated content items, a landing page associated with one or more content items, a keyword (e.g., descriptive term, actor, actress, genre, director, sports team, and/or the like), and/or the like. For example, the interface element can comprise an invitation, notification, link to and/or the like to access the content item. In one aspect, the interface element can comprise and/or be associated with one or more identifiers. For example, the interface element can comprise and/or be associated with at least one user agnostic identifier. A user agnostic identifier is an identifier that does not identify any user. For example, a user agnostic identifier can comprise an identifier of content, such as a content item, and/or a group of related content. A user agnostic identifier can become associated with a user without identifying the user. For example, if a user has a subscription or other rights allowing the user to access the content item from a particular content source or provider, then user agnostic identifier can be associated with the user (e.g., by the content provider), but such association does not make the user agnostic identifier an identifier of a user.

As an illustration, the user agnostic identifier can comprise one or more names, titles, numbers, symbols, characters, a combination thereof, and/or the like. For example, the user agnostic identifier can comprise and/or be associated with general identifiers, internal identifiers, third party identifiers (e.g., Rovi® ID), user generated identifiers, and/or the like. For example, the user agnostic identifier can comprise and/or be associated with one or more symbols (e.g., hashtag) associated with a sequence of characters (e.g., content name, title, genre, actor, director, content source, social media identifier), and/or the like. In one aspect, the user agnostic identifier can comprise more than one identifier, keyword, symbol, character sequence, and/or the like. For example, a first portion of the user agnostic identifier can comprise a first keyword, identifier, character sequence, symbol and/or the like. A second portion of the user agnostic identifier can comprise a second keyword, identifier, character sequence, symbol, and/or the like.

In one aspect, the content unit 106 can be configured to associate the interface element with the at least one user agnostic identifier by requesting the user agnostic identifier from a local database or a remote device, such as the intermediary device 116, content device 122, and/or the like described herein. For example, the social media device 102 and/or remote device can maintain a database, index, and/or the like of associations between user agnostic identifiers and corresponding symbols, keywords, and/or the like. The content unit 106 can query the index, database, and/or the like based on input (e.g., keyword, symbol) received from the user. In one aspect, the user agnostic identifier can comprise a uniform resource identifier (e.g., uniform resource locator) for a landing page, or other content location. As another example, the user agnostic identifier can comprise the keyword, symbol, and/or other user input. For example, the content unit 106 can determine the user agnostic identifier by adding one or more numbers, sequences, identifiers, symbols, and/or the like or otherwise formatting the symbols, keywords, and/or the like provided by the user.

As another example, the interface element can comprise and/or be associated with at least one user specific identifier. A user specific identifier is an identifier that identifies one or more users. For example, the user specific identifier can be an account identifier. In one aspect, the interface element can be associated with a first user specific identifier configured to identify a social media user who posted or otherwise associated the interface element with his or her social media feed. In another aspect, the interface element can be associated with a second user specific identifier. The second user specific identifier can be configured to identify a user who interacted with the interface element. For example, the interface element can be configured to provide the first user specific identifier and/or second user specific identifier to a remote device such as the intermediary device 116, social media device 102, or other device.

In one aspect, a user specific identifier can identify one or more classes of users, groups of users, and/or the like. For example, a user specific identifier can identify a location, such as a regional location, physical address, and/or the like. A user specific identifier can identify a class of service, such as an account tier, subscription tier, and/or the like. A user specific identifier can identify a user transaction, purchase, and/or the like. As another example, a user specific identifier can comprise a user name, account identifier, user preference, and/or the like. A user specific identifier can comprise a network address identifying one or more user devices. For example, the network address can comprise an internet protocol address, media access control address, and/or the like. As another example, a user specific identifier can comprise a session identifier configured to identify a session between one or more users and a device (e.g., social media device 102, intermediary device 116). As an illustration, a user specific identifier can be determined from, provided in, and/or otherwise indicated in a cookie or other user data file.

In one aspect, the social media device 102 can be communicatively coupled to one or more user devices 108 through a network 110. In one aspect, the network 110 can comprise a packet switched network (e.g., internet protocol based network), a non-packet switched network (e.g., quadrature amplitude modulation based network), and/or the like. The network 110 can comprise network adapters, switches, routers, modems, and the like connected through wireless links (e.g., radio frequency, satellite) and/or physical links (e.g., fiber optic cable, coaxial cable. Ethernet cable, or a combination thereof). In one aspect, the network 110 can be configured to provide communication from telephone, cellular, modem, and/or other electronic devices to and throughout the system 100.

In one aspect, an example user device 108 can comprise a computing device (e.g., desktop computer, workstation), laptop, tablet device, mobile device (e.g., mobile phone), smart device (e.g., smart phone, smart watch, smart glasses, smart accessory), set top box, digital streaming device, television, and/or the like. A user device 108 can receive content from a variety of devices. For example, the user device 108 can be configured to receive content (e.g., social media information, user interface information) from the content unit 106 of the social media device 102. As another example, the user device 108 can receive content from other devices, such as the content devices and intermediary device described herein.

In one aspect, the user device 108 can comprise an interface unit 112 configured to provide (e.g., render) a user interface for a user. For example, the interface unit 112 can be configured to render a variety of content (e.g., content from the social media device 102) through one or more software applications, such as content browsers, electronic program guides, video rendering engines, text overlay applications and/or the like. In one aspect, the user device 108 can comprise a network unit 114 configured to receive and transmit content across the network 110. For example, the network unit 114 can comprise a tuner configured to tune to a variety of content channels (e.g., spectrum allocations). As a further example, the tuner can be configured to select content from a content stream delivery based on modulation techniques such as, quadrature amplitude modulation (QAM), quadrature phase-shift keying (QPSK), and/or the like. As another example, the network unit 114 can be configured to request and receive content streams based packet switching protocols, such as internet protocol.

In one aspect, the system 100 can comprise an intermediary device 116 configured to provide access to content. For example, the intermediary device 116 can be configured to provide a user access to content relevant to an interface element, such as an interface element provided with the user interface information by the social media device 102. As an illustration, an interface element can be added to a social media element (e.g., post, message). The interface element can be associated with a particular content item (e.g., show, program, movie, episode). If a user interacts with the interface element, then the interface element can provide a request to the intermediary device for content relevant to the content item.

In one aspect, the intermediary device 116 can comprise a landing unit 115. The landing unit 115 can be configured to provide landing pages for a variety of content. The landing page can be provided as a web page, user interface page or context, document, window, and/or the like. For example, the landing unit 115 can comprise a landing page for at least one (e.g., each) content item (e.g., show, episode, movie, program). The landing page can be configured to display information about a content item, such as title, show times, episodes of the content item, and content providers that provide access to the content item. In one aspect, a landing page can comprise metatags or other identifiers configured to allow other devices, such as the social media device 102 to identify the landing page and retrieve information about the content item. For example, the landing page can comprise the user agnostic identifier (e.g., in a metatag).

As an illustration, the social media device 102 can receive a resource locator (e.g., uniform resource locator) identifying a landing page from a user. The social media device 102 can retrieve and process the landing page. For example, the social media device 102 can identify a user agnostic identifier or other information in a field, metatag, and/or elsewhere on the landing page. The social media device 102 can determine to provide an interface element (e.g., by inserting the interface element in a post, message, status, or the like) based on the user agnostic identifier and/or other information on the landing page. In one aspect, the interface element can comprise and/or be associated with user agnostic identifier or other information received from the landing page.

In one aspect, the intermediary device 116 can comprise a content query unit 118 configured to process requests for content. For example, the content query unit 118 can receive requests for content from a user based on an interaction with an interface element. The interface element can comprise the interface element provided with the user interface information by the social media device 102. The interface element can be on any user interface page, web page, dynamic page, search results page, document, window, and/or the like. The interface element can reference (e.g., link to) the landing page. An interaction with the interface element can cause a user to be redirected to the landing page. The landing page can comprise or otherwise communicate with the content query unit 118. For example, the landing page can automatically request content from the content query unit 118 when the landing page is loading. As another example, the landing page can request content from the content query unit 118 in response to a request from a user for content on the landing page.

In one aspect, the intermediary device 116 can comprise an authentication unit 120 configured to authenticate a user (e.g., user requesting content). In another aspect, the authentication unit 120 can be configured to receive user information, such as one or more user specific identifiers (e.g., based on an interaction with the interface element). In one aspect, the authentication unit 120 can be configured to authenticate a user based on the user information, such as the one or more user specific identifiers. For example, the authentication unit 120 can comprise an account database. The account database can comprise a plurality of associations, such as associations of user specific identifiers with user accounts. The user accounts can be specific to one or more content providers (e.g., service provider, and/or the like). As another example, the authentication unit 120 can be configured to send the one or more user specific identifiers to a device managed by a content provider (e.g., content device 122).

In another aspect, the authentication unit 120 can be configured to provide a user login for a user to enter user information, such as user credentials (e.g., account identifier, password). For example, the authentication unit 120 can provide an interface to a user to login to a particular content provider. As an example, the authentication unit 120 can provide the user login on the landing page. As an illustration, a user can be provided with a list (e.g., on the landing page) of one or more content providers. The user can select a content provider from the list. The authentication unit 120 can provide (e.g., on the landing page) a user login for the content provider in response to the selection. In one aspect, the cookie, user data file, and/or the like can indicate that a user is already authenticated with the content device 122, intermediary device 116, and/or the like.

In one aspect, the intermediary device 116 can be configured to receive user information, such as the user specific identifiers, or other account information or credential from a remote device, such as the social media device 102 and/or content device 122. For example, the intermediary device 116 can receive a cookie, a user data file, and/or the like. The authentication unit 120 can be configured to authenticate, verify, and/or otherwise process the cookie and/or user data file. Additionally, the authentication unit 120 can be configured to provide the user information from the remote device to the content device 122.

In one aspect, the content query unit 118 can be configured to determine (e.g., select) content based on a variety of information such as user information, identifiers, timing information, ranking, availability, and/or the like. For example, the content query unit 118 can be configured to determine content based on the user agnostic identifier. The content query unit 118 can be configured to receive a user agnostic identifier. For example, the user agnostic identifier can be received in a request for content from a user and/or a user interaction with the interface element provided by the social media device 102. The user agnostic identifier can be associated with and/or indicative of one or more content items. For example, the user agnostic identifier (e.g., or copy thereof) can be stored in a database (e.g., local or remotely located) configured to correlate the user agnostic identifier with one or more content items.

As another example, the content query unit 118 can be configured to determine content based on user information, such as login credentials (e.g., from the authentication unit 120), one or more user specific identifiers received from an interface element, and/or other user data. For example, the content query unit 118 can request information relevant to content from a content device 122 managed by a content provider (e.g., content provider selected by a user). The request for information relevant to content can comprise a request for at least one reference to content. For example, the request can comprise a request for a list of references to content. A reference to content can comprise a location where the content can be accessed. The location can be specific to a content provider. For example, the location can be a location within a distribution network and/or access network of a specific content provider. In one aspect, the reference to content can comprise computer executable code and/or link(s) configured to open the content in an application (e.g., mobile application, web application) and/or device. As an illustration, the reference to content can comprise a link to open a separate application (e.g., mobile app specific to the content provider). As another illustration, the reference to content can comprise a link configured to control operation of a remote device. For example, the link can cause a set top box, television, tablet or other user device to tune to or otherwise access content from the remote device.

In one aspect, the intermediary device 116 can comprise a ranking unit 124 configured to rank, filter, prioritize, and/or otherwise process the references to content determined by the content query unit 118. The ranking unit 124 can rank, filter, prioritize, and/or otherwise process the references to content based on how a user accessing the content will affect a content viewership rating. A content viewership rating can comprise for example, Nielsen ratings or other audience measurement system. As an example, a viewership rating can comprise a number of users accessing content within a time period. The time period can begin at the initial release and/or broadcast of content. The time period can expire after a predetermined time such as, 1 day, 2 days, 5 days, 8 days, 30 days, and the like. As an illustration, the intermediary device 116 can receive a list of more than one reference to content. The ranking unit 124 can rank, filter, prioritize, and/or otherwise process the references to content on the list according to how the user accessing the referenced content will affect a viewership rating. As a further illustration, an example viewership rating can comprise the number of users accessing a first content item with a first time period. A first reference to content can be a link to access the first content item before the end of the first time period. A second reference to content can comprise a link to access the first content item after the first time period. The ranking unit 124 can rank the first reference to content before the second reference to content.

In one aspect, the ranking unit 124 can filter certain references to content. For example, the ranking unit 124 can remove references to content from a list of references to content based on the ranking of the reference. As a further example, the ranking unit 124 can remove lower ranking references (e.g., references below a threshold ranking) from the list of references.

In one aspect, the ranking unit 124 can be configured to rank, filter, prioritize, and/or otherwise process the references to content based on time information. For example, time information can comprise a current time, one or more times the content was previously provided (e.g., broadcast, multicast, unicast) and/or accessed, one or more times the referenced content is scheduled to be provided (e.g., or accessed, recorded, processed), and/or the like.

In one aspect, the ranking unit 124 can be configured to rank, filter, prioritize, and/or otherwise process the references to content based on content information. For example, content information can comprise bit rate, content quality (e.g., standard definition, high definition, 4K high definition, three dimensional surround sound), content language, content metadata (e.g., actors, genre, relationship to other content), content source, content price, and/or the like.

In one aspect, the ranking unit 124 can be configured to rank, filter, prioritize, and/or otherwise process the references to content based on user information. For example, user information can comprise viewing history, demographics, social media (e.g., affinity, favorites, likes, social media history, relationship information, social media history of contacts or friends), account information (e.g., subscription tier), and/or the like. In one aspect, the user information can be user information for more than one user. For example, multiple users can access content from the same account, device, household, building, office, and/or the like.

In one aspect, the ranking unit 124 can be configured to prioritize, weigh, and/or resolve conflicts between one or more rankings generated by the ranking unit 124. For example, the ranking unit 124 can prioritize, weigh, and/or resolve conflicts a ranking based on the user information, time information, content information, viewership rating information, and/or the like.

In one aspect, the intermediary device 116 can comprise an access unit 126 configured to provide access to content. For example, the access unit 126 can provide one or more access elements configured to allow access to content. An access element can comprise a link to access content. For example, the access element can comprise a list of content options. An access element can comprise a content delivery element configured to deliver, render, and/or otherwise provide the referenced content to a user. As an example, the access unit 126 can provide one or more options for accessing content. The access unit 126 can be configured to provide the one or more references to content as a list of one or more content options. For example, the access unit 126 can provide the references to content as a plurality of links to access one or more content items from one or more devices. In one aspect, the access unit 126 can provide options to record content, remind a user of future availability of content, and/or the like. In one aspect, the access unit 126 can be configured to provide an option to favorite or like content, download content, purchase content access to content (e.g., cinema tickets, streaming rights, download rights, DVD rights), reserve content, and/or the like.

In one aspect, the access unit 126 can provide options to access content from one or more devices, such as a set top box, digital streaming device, television, computing station (e.g., desktop computer, workstation), mobile device (e.g., mobile phone, smart device (e.g., smart watch, smart apparel, smart glasses, activity tracker), transportation device (e.g., dashboard display, onboard display), and/or the like. In one aspect, the access unit 126 can provide options to access content through one or more applications on the one or more devices (e.g., local or remote devices). For example, an application can comprise a web browser, a service provider (e.g., internet provider, cable provider) application, a content publisher (e.g., content channel) application, mobile application, customized content channel, and/or the like.

As an illustration, the access unit 126 can provide a first option to access a first content item from a first device (e.g., the device receiving the one of more content options). The access unit 126 can provide a second option to access the first content item from a second device (e.g., set top box). The access unit 126 can provide a third option to access the first content item from a third device (e.g., mobile device). The access unit 126 can provide additional options to access different content items from different devices, from different applications, in different formats, under different accounts, for different prices, at different times, and/or the like.

In one aspect, the intermediary device 116 can comprise a tracking unit 128 configured to track user behavior. For example, user behavior can be tracked based on at least one of a user specific identifier, a user agnostic identifier, an access element, a notification, and/or the like. As an illustration, the tracking unit 128 can receive notifications of user behavior from a remote device, such as a device managed by a content provider (e.g., content device 122). In one aspect, a user specific identifier and/or a user agnostic identifier can be associated with a marketing campaign. The tracking unit 128 can be configured to provide information related to the marketing campaign. For example, the tracking unit 129 can be configured to provide statistics, such as the a number of users accessing the content, the number of users accessing the content based on an interaction with an interface element from a social media device, a time related metric (e.g., average viewing time), information about user interactions with the content, and/or the like.

In one aspect, the system 100 can comprise one or more content devices 122 configured to provide content to users (e.g., subscribers of content services) or otherwise manage content and/or users. The content devices 122 can be managed by one or more content providers (e.g., service providers). For example, a content device 122 can be configured to provide content through a packet switched network and/or non-packet switched network (e.g., quadrature amplitude modulation based network). A content device 122 can comprise a content server, account information, user behavior statistics, and/or the like. As an example, a content device 122 can comprise a converged access device, such as a converged cable access platform (CCAP).

In one aspect, a content device 122 can comprise a request unit 130 configured to process requests. For example, the request unit 130 can be configured to process a request (e.g., for content) received from a user device 108 (e.g., received by the content device 122 and/or received by the intermediary device 116). The request can be provided in response to a user interacting with (e.g., clicking) a content option and/or reference to content provided to the user by the intermediary device 116. As another example, the request can be received from a user application (e.g., mobile application, set top box application, content browser). In response to the request, the request unit 130 can provide the requested content to the requesting device.

In another aspect, the request unit 130 can be configured to process requests for information relevant to content. In one aspect, the requests for information relevant to content can be processed based on one or more identifiers, such as the user agnostic identifier and one or more user specific identifiers. For example, the user agnostic identifier can identify and/or be associated with content at the content device 122 and/or other content of the content provider managing the content device 122. The request unit 130 can be configured to identify one or more content items relevant to the content. In one aspect, the request unit 130 can be configured provide (e.g., in response to a request for information) references to content, such as references to content items. As an illustration, content can be identified as relevant to and/or related to the user agnostic identifier.

As an illustration, the user agnostic identifier can comprise one or more names, titles, numbers, symbols, characters, a combination thereof, and/or the like. The request unit 130 can be configured to process (e.g., parse) the user agnostic identifier to identify at least a portion of the user agnostic identifier indicative of content. For example, the at least a portion of the user agnostic identifier can be processed by a natural language processor and/or compared to similar identifiers managed by the content device 122. As another example, the at least a portion of the user agnostic identifier can comprise a unique identifier. The request unit 130 can be configured to identify relevant content by searching (e.g., an index, a database) for content (e.g., content items) associated with the unique identifier. For example, the user agnostic identifier can comprise and/or be associated with internal identifiers, third party identifiers (e.g., Rovi ID, TMS ID), user generated identifiers, and/or the like. For example, the user agnostic identifier can comprise and/or be associated with one or more symbols (e.g., hashtag) associated with a sequence of characters (e.g., content name, title, genre, actor, director, content source, social media identifier), and/or the like.

In one aspect, the request unit 130 can be configured to identify one or more general identifiers based on the user agnostic identifier. For example, the request unit 130 can access a database or other logical data structure configured to define a plurality of relationships (e.g., hierarchical relationships, machine learned relationships) between general identifiers. The request unit 130 can search the database or other logical data structure for general identifiers associated with or otherwise relevant to the user agnostic identifier. As an illustration, the user agnostic identifier can comprise and/or be associated with a general identifier of a recurring program, such as a show, series, newscast, sportscasts. The user agnostic identifier can comprise and/or be associated with a general identifier of an episode of a recurring program. The user agnostic identifier can comprise and/or be associated with a general identifier of an actor, actress, director, producer, character, genre, sports team, company, organization, location, subject matter, and/or the like. The user agnostic identifier can comprise and/or be associated with a general identifier of a particular content provider, such as content channel, content network, content publisher, and/or the like. For example, the database and/or other logical data structure can comprise a plurality of relationships associating general identifiers with one or more other general identifiers. Additionally, the database and/or logical data structure can comprise a plurality of relationships associating general identifiers with user information, user agnostic identifiers, user specific identifiers, and/or the like.

In one aspect, the request unit 130 can be configured to identify one or more content items based on user information associated with the request. The request unit 130 can determine whether a user associated with the request is allowed to access the identified content. For example, the request unit 130 can identify an associated user based on the one or more user specific identifiers, user credentials (e.g., from a login), and/or other user information. In one aspect, the identified user can be associated with access privileges (e.g., subscriptions) and other rights that can allow or prevent the identified user from accessing the identified content. The request unit 130 can identify the content that the user has rights to access. For example, the request unit 130 can be configured to identify content recordings, content purchases, downloaded content, accessed content, and/or the like associated with the user information. For example, the content can be located in a user device (e.g., user device 108) or remotely stored by a device (e.g., content device 122) on the network 110. The request unit 130 can be configured to provide references to the identified content to the intermediary device 116. For example, the request unit 130 can provide the identified content as one or more (e.g. a list of) references to content. The references to content can be indicative of a location or procedure for accessing the identified content.

In one aspect, the request unit 130 can be configured to provide the selected content based on timing information associated with the request. For example, the request unit 130 can determine the time the request was received, the time the user interacted with the interface element, and/or other timing information. In one aspect, the timing information can define a time range for when the content is available. If the content is available during the time range, then the request unit 130 can select the content. As an illustration, the request can be a request for content available at a current time. If the content is available at the current time, then the request unit 130 can identify the content as content currently available for viewing. For example, the request unit 130 can provide a reference to access a live content stream currently providing the content. In one aspect, the timing information can be based on a time zone of a user, a time zone of content provider, and/or the like.

As a further illustration, the request unit 130 can be configured to identify a content item (e.g., an episode, movie) and/or a group of content items (e.g., episodes of a recurring program, content items of genre or featuring a particular actor, actress, sports team, or the like) specified by the user agnostic identifier. In some scenarios, the user agnostic identifier may not specify a specific content item or group of content items. In other scenarios, the user agnostic identifier may specify content that is not available. The request unit 130 can identify similar relevant content as described herein and provide references to the identified content in response to a request.

In another aspect, the content device 122 can comprise a notification unit 132 configured to provide notifications of user behavior to a device, such as the intermediary device 116. For example, the notification unit 132 can be configured to provide notifications of a variety of user behaviors, such as user interactions with content. The content can be content accessed by the user based on a reference to content and/or content option provided to the user by the intermediary device 116. A user interaction can comprise an interaction with a playback control associated with the content. For example, a notification can be provided when a user plays, stops, pauses, fast-forwards, rewinds, or otherwise interacts with content. A notification can be provided by the notification unit 132 when a user exits an application and/or closes window configured to render the content to the user. A notification can be provided by the notification unit 132 when a user tunes a user device away from content, interacts with an advertisement associated with the content, posts a reference to the content on a social media device 102, and/or the like.

It should be noted that one or more features of the social media device 102, user device 108, content device 122, and/or intermediary device 116 can be implemented as one or more local or remote devices. For example, the content unit 106 and/or account unit 104 can be implemented by one or more local or remote devices. The notification unit 132 and/or request unit 130 can be implemented by one or more local or remote devices. The content query unit 118, authentication unit 120, ranking unit 124, access unit 126, landing unit 115, and/or tracking unit 128 can be implemented by one or more local or remote devices.

Figure 2:
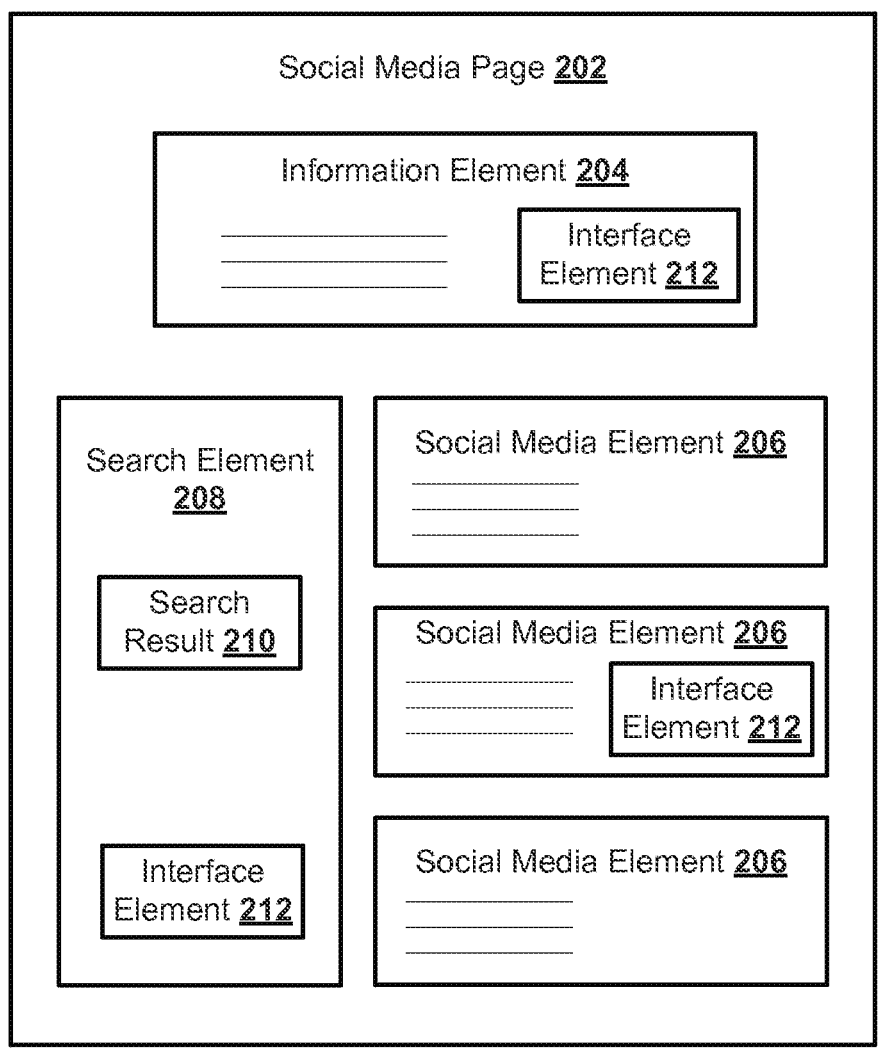
FIG. 2 is a block diagram of an example user interface for social media device.

FIG. 2 is a block diagram illustrating an example user interface 200. For example, the user interface 200 can comprise a social media page 202. The social media page 202 can display social media as messages, posts, status updates, favoriting, bookmarking, approving, user interactions, and/or the like. The social media can comprise videos, images, audio, text, and/or the like. For example, the social media page 202 can comprise an information element 204. The information element can display background information about a social media user (e.g., individual, organization, group, company, provider). Background information can comprise history, interests, goals, social relationships, and/or the like.

In one aspect, the social media page 202 can comprise social media elements 206. For example, a social media element can comprise a status update, wall post, social message, link, image, video, text, and/or the like. The social media page 202 can display new social media elements 206 as social media users interact with an account, page, and/or other media.

In one aspect, the social media page 202 can comprise a search element 208 configured to provide search information. For example, the search element 208 can receive a search requests from a user. The search element 208 can process the request (e.g., send to a server requesting search results). The search element 208 can display search results based on the search request.

In one aspect, the social media page 202 can comprise one or more interface elements 212. For example, the social media page 202 can be configured to display the interface elements 212 based on analysis of the social media element 206, information element 204, and/or search element. For example, the social media page can be configured to perform textual analysis such as natural language processing to identify one or more identifiers, keywords, and/or the like as described herein. The social media page can identify a user agnostic identifier associated with the keyword, identifier and/or other content detected on the social media page. The social media page can associate (e.g., automatically, by user request, and/or by selection of a suggestion to a user) a user agnostic identifier with an interface element. The interface element can provide access to content associated with the user agnostic identifier. For example, the user agnostic identifier can be associated with a landing page or other interface for a content provider. As a further example, the interface element can comprise a button inviting a user to click on the button to view content associated the social media element, search result, and/or information element.

Figure 3:
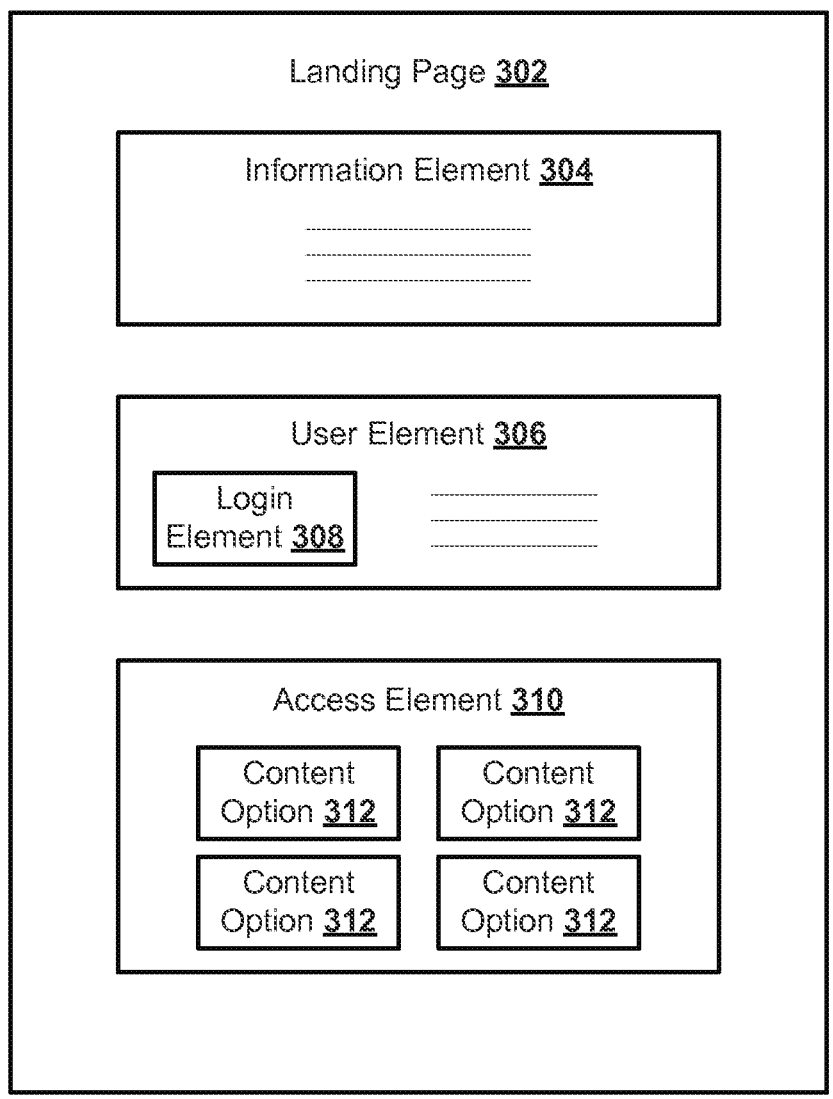
FIG. 3 is a block diagram of an example user interface for an intermediary device.

FIG. 3 is a block diagram illustrating an example content user interface 300 for an intermediary device. In one aspect, the user interface 300 can comprise a landing page 302 configured to provide content options associated with a user agnostic identifier. For example, the landing page 302 can comprise an information element 304 configured to provide general information about content associated with the user agnostic identifier. For example, the user agnostic identifier can identify a television show, program, movie, and/or the like. The information element 304 can be configured display information about the television show, program, movie, and/or the like. For example, the information element 304 can describe the plot, actors, actresses, episode information, viewing history, and/or the like.

In one aspect, the landing page 302 can comprise a user element 306. The user element can comprise and/or be associated with user information, such as user name, user history, social media information (e.g., messages, contacts, posts). For example, the user information can be associated with the user agnostic identifier. In one aspect, the user element can comprise a login element 308 configured to allow a user to login to an account. For example, the login element 308 can allow a user to login to an account of a content provider. As a further example, the user element 306 can provide one or more options for logging in to one or more content providers associated with the user agnostic identifier. For example, the content providers can comprise content indicated by and/or related to the user agnostic identifier. As another example, the login element 308 can allow the user to login to an account provided by the intermediary device hosting the landing page 302.

In one aspect, the landing page 302 can comprise an access element 310 configured to provide to access content at one or more content providers. For example, the access element can provide one or more content options 312. A content option 312 can be an option to view content, access content, bookmark content, favorite content, share content, and/or the like. In one aspect, the content options 312 can be specific to a content provider, such as a content provider that the user has logged into through the login element 308, or otherwise. For example, the landing page 302 can be configured to access user tracking data, such as a cookie, indicating login information of a user. As another example, the landing page 302 can be configured to receive user information, such as one or more user specific identifiers, from an interface element (e.g., interface element 212 of FIG. 2) from a social media page, search results, profile page, and/or the like. The user specific identifiers can comprise a first user identifier indicative of a user posting and/or inserting the interface element on a page. The user specific identifiers can comprise a second user identifier indicative of a user interacting with (e.g., clicking on) the interface element.

In one aspect, a content option 312 can comprise a resource locator configured to identifier a location of content within a content distribution and/or access network of a content provider. A content option 312 can comprise a script configured to call an application programming interface (API) of a content provider. For example, a content option can comprise a call to control and/or access a remote storage device, set top box, television, and/or the like associated with a user and/or content provider. As an illustration, a content option 312 can comprise an option to tune a tuner of a set top box to a specific content channel provided by a content provider. A content option 312 can comprise an option to record content at set top box and/or digital storage device (e.g., remote or local, associated with user and/or content provider) to a specific content channel. A content option 312 can be an option to schedule a future reminder to access content (e.g., when a future episode airs).

Figure 4:
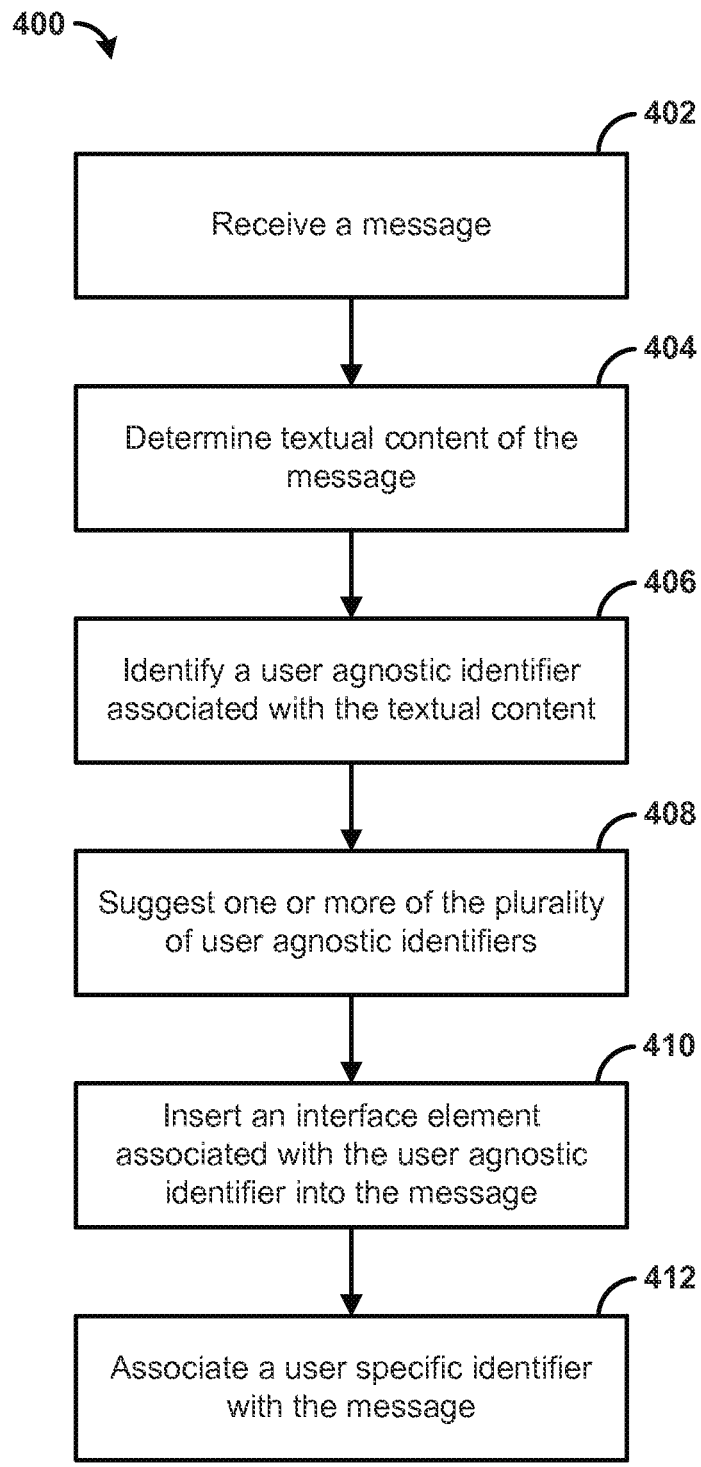
FIG. 4 is a flowchart of an example method for implementing one or more features of the disclosure.

FIG. 4 is a flowchart illustrating an example method 400 for implementing one or more features of the disclosure. At step 402, a message can be received. The message can be received on a social media server. For example, the message can comprise a social media post, status, message, and/or the like. At step 404, textual content of the message can be determined. The textual content of the message can be associated with media content. The media content can comprise one or more of audio and video. For example, the media content can comprise a movie, television show, program, episode, video on demand, and/or the like. For example, the textual content can comprise a description of the content, such as title, actor, actress, genre, social media handle, name of a show, and/or the like.

At step 406, a user agnostic identifier associated with the textual content can be identified. The user agnostic identifier can comprise an identifier configured to identify one or more items of the media content. For example, the user agnostic identifier can identify a first item of the media content hosted by a first content provider and a second item of the media content hosted by a second content provider. In one aspect, identifying a user agnostic identifier associated with the textual content can comprise determining one or more keyword matches between the textual content and a database (e.g., local or remote) of keywords associated with a plurality of user agnostic identifiers. The user specific identifier can be configured to identify a user originating the message.

At step 408, one or more of the plurality of user agnostic identifiers can be suggested based on the one or more keyword matches. For example, a search of an index and/or database can be performed based on the keywords. The index and/or database can associate the keywords with user agnostic identifiers. At step 410, an interface element associated with the user agnostic identifier can be inserted into the message. The interface element can comprise the user interface identifier. For example, the interface element can comprise a user-selectable button. The button can be configured to provide the user agnostic identifier based on user interaction with the button. At step 412, a user specific identifier can be associated with the message. For example, the user specific identifier can identify a user posting a message and/or a user interacting with the interface element.

Figure 5:
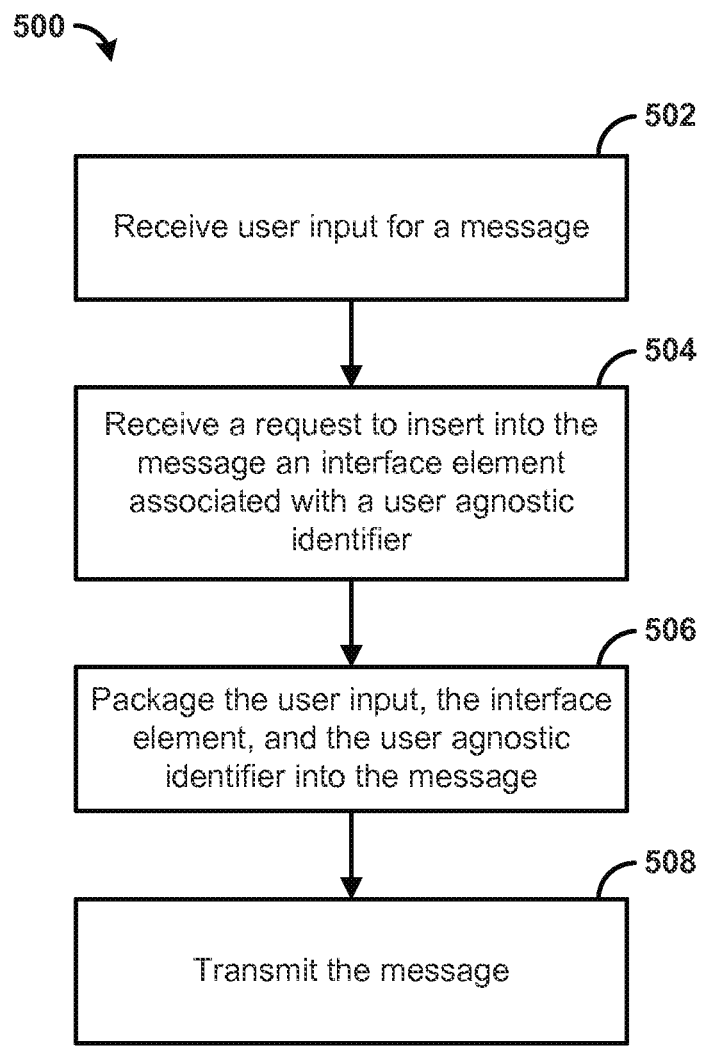
FIG. 5 is a flowchart of another example method for implementing one or more features of the disclosure.

FIG. 5 is a flowchart illustrating an example method 500 for implementing one or more features of the disclosure. At step 502, user input for a message can be received. The user input can comprise textual content associated with media content. The user input can comprise social media information, such as a post, status update, message, and/or the like. The media content can comprise one or more of audio and video, such as a program, show, episode, movie, song, a collection thereof, and/or the like.

At step 504, a request to insert into the message an interface element associated with a user agnostic identifier can be received. The user agnostic identifier can comprise an identifier configured to identify a first item of the media content hosted by a first content provider and a second item of the media content hosted by a second content. The user agnostic identifier can identify group of content associated with a show, actor, genre, directory, channel, and/or other keyword (e.g., descriptive term). In one aspect, the interface element can comprise a user-selectable button.

At step 506, the user input, the interface element, and the user agnostic identifier can be packaged into the message. For example, the message can display the user input with the interface element. The user agnostic identifier can be a field or other attribute of the interface element. In one aspect, a user specific identifier is packaged into the message with the user input, the interface element, and the user agnostic identifier. For example, the user specific identifier and/or other user information can be stored in field and/or attribute (e.g., which may or may not be displayed to a user) of the interface element. The user specific identifier can be configured to identify a user originating the message. At step 508, the message can be transmitted.

Figure 6:
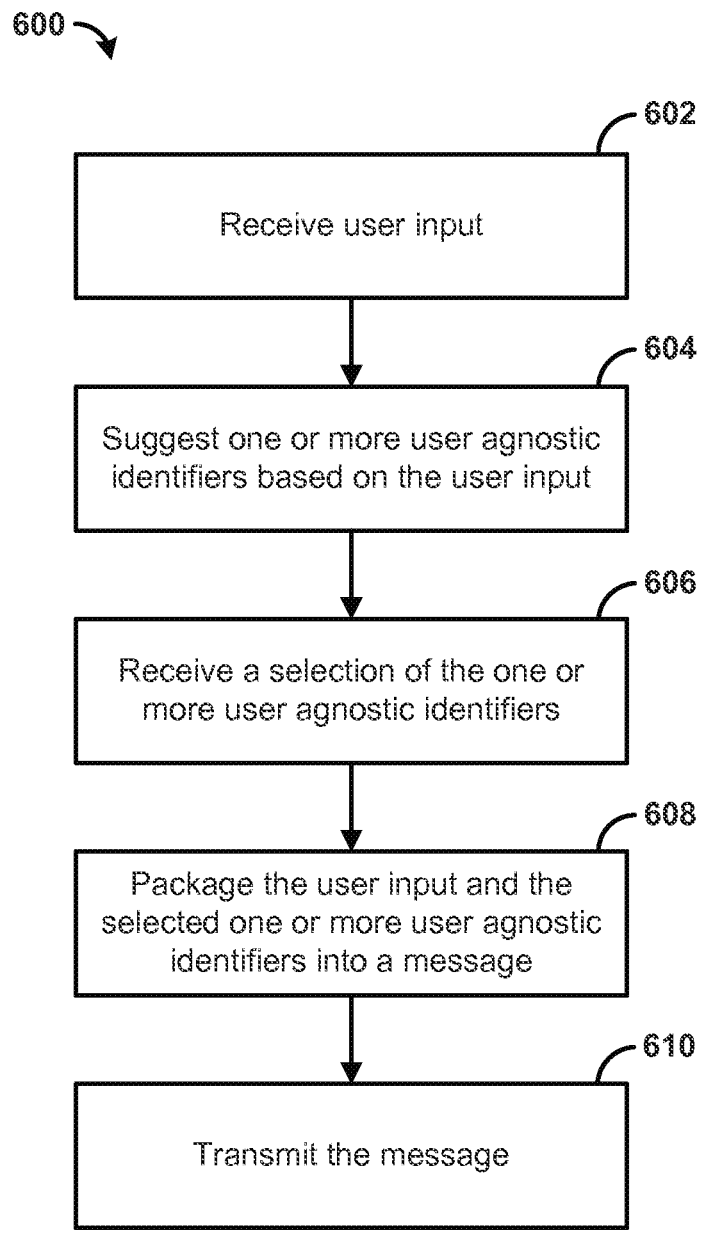
FIG. 6 is a flowchart of another example method for implementing one or more features of the disclosure.

FIG. 6 is a flowchart illustrating an example method 600 for implementing one or more features of the disclosure. At step 602, user input can be received. In one aspect, the user input can comprise textual content associated with media content. The media content can comprise one or more of data, audio, and video. The user input can comprise social media information, such as a post, status update, message, and/or the like. The media content can comprise one or more of audio and video, such as a program, show, episode, movie, song, a collection thereof, and/or the like.

At step 604, one or more user agnostic identifiers can be suggested based on the user input. The one or more user agnostic identifiers each (or at least one of) can comprise an identifier configured to identify one or more items of the media content. In one aspect, suggesting one or more user agnostic identifiers based on the user input can comprise determining one or more keyword matches between the user input and a database (e.g., local or remote) of keywords associated with a plurality of user agnostic identifiers.

At step 606, a selection of the one or more user agnostic identifiers can be received. For example, a user can select the one or more user agnostic identifiers and/or a representation indicative of the one or more user agnostic identifiers. As another example, the one or more user agnostic identifiers can be selected automatically based on a textual analysis, such as natural language processing. At step 608, the user input and the selected one or more user agnostic identifiers can be packaged into a message. In one aspect, packaging the user input, and the selected one or more user agnostic identifiers into a message can further comprise packaging an interface element into the message. In another aspect, a user specific identifier can be packaged into the message with the user input and the selected one or more user agnostic identifiers. The user specific identifier can be configured to identify a user originating the message. In one aspect, packaging can comprise combining as one display element (e.g., window, box), inserting information (e.g., the user agnostic identifier, user specific identifier) into a field, attribute, and/or other part of an display element and/or the interface element. At step 610, the message can be transmitted. For example, the message can be transmitted to one or more users accessing a social media server.

Figure 7:
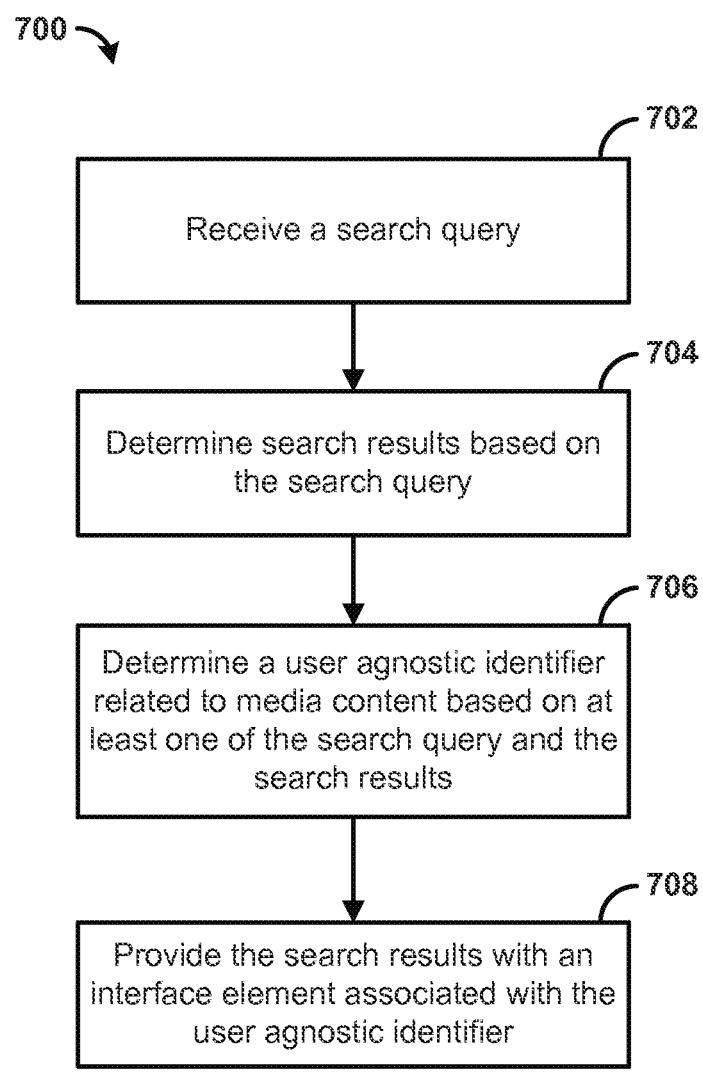
FIG. 7 is a flowchart of another example method for implementing one or more features of the disclosure.

FIG. 7 is a flowchart illustrating an example method 700 for implementing one or more features of the disclosure. At step 702, a search query can be received. In one aspect, the search query can be received from a social media page other user interface. At step 704, search results can be determined based on the search query. For example, the search query can be matched to an index, database, or other content. At step 706, a user agnostic identifier related to media content can be determined based on at least one of the search query and the search results. In one aspect, determining a user agnostic identifier related to media content based on at least one of the search query and the search results can comprise analyzing textual content in at least one of the search query and the search results. For example, natural language processing can be performed on at least one of the search results and search query. Keywords (e.g., descriptive terms) can be identified. The keywords can be compared to a database, index, and/or the like associating keywords with user agnostic identifiers.

At step 708, the search results can be provided with an interface element associated with the user agnostic identifier. The interface element can be configured to provide access to a resource configured to provide options for accessing one or more items of the media content. The interface element can comprise a user-selectable button. In one aspect, the interface element can be configured to provide the user agnostic identifier and user information to a content provider in response to an interaction with the interface element by a user. The user information can comprise a user specific identifier associated with the user. For example, the interface element can be configured to associate the user specific identifier with the user agnostic identifier in response to the interaction. In one aspect, the options for accessing one or more items of media content can comprise an option to at least one of access an item of media content relevant to a user based on a time of an interaction with the interface element.

Figure 8:
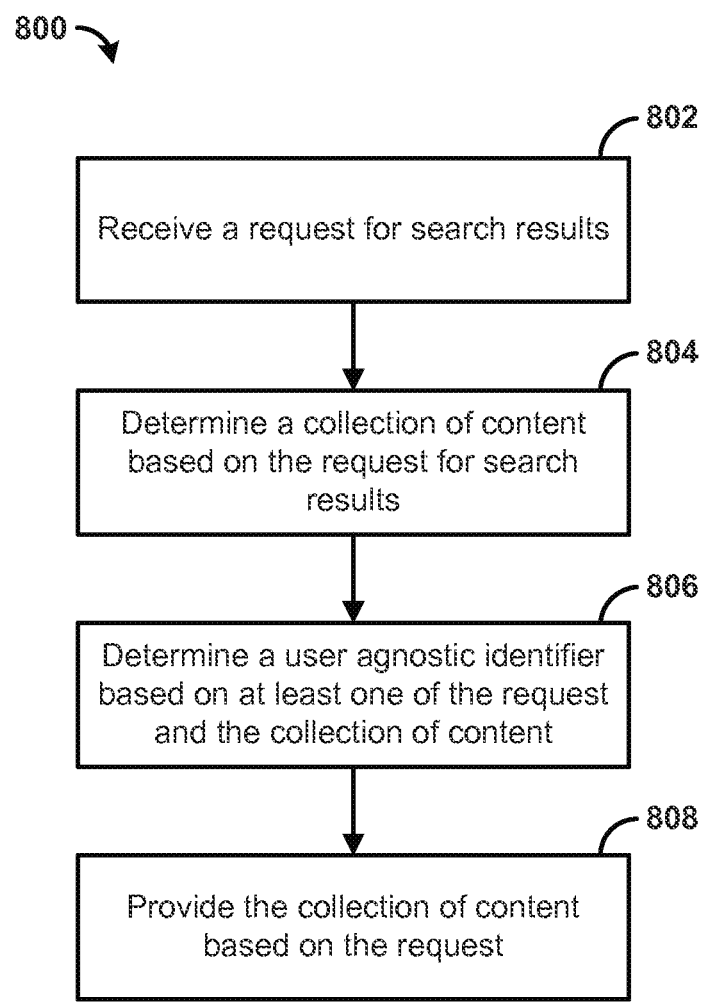
FIG. 8 is a flowchart of another example method for implementing one or more features of the disclosure.

FIG. 8 is a flowchart illustrating an example method 800 for implementing one or more features of the disclosure. At step 802, a request for search results can be received. For example, the request for search results can be received from a user on a social media page or other user interface. At step 804, a collection of content can be determined based on the request for search results. For example, the collection of content can comprise web pages, audio, video, text, and/or the like matching the request for search results.

At step 806, a user agnostic identifier can be determined based on at least one of the request and the collection of content. In one aspect, determining a user agnostic identifier based on at least one of the request and the collection of content can comprise analyzing textual content in at least one of the search query and the collection of content. For example, natural language processing can be performed to identify one or more keywords (e.g., descriptive terms). A database, index, and/or the like can be queried to obtain user agnostic identifiers matching the keywords. In another aspect, the user agnostic identifier can comprise one or more of the identified one or more keywords.

At step 808, the collection of content can be provided based on the request. In one aspect, the collection of content can be provided with an interface element configured to provide the user agnostic identifier based on a user interaction with the interface element. The interface element can comprise a user-selectable button. The interface element can be configured to provide user information with the user agnostic identifier in response to the user interaction with the interface element by a user. The user information can comprise a user specific identifier associated with the user. The interface element can be configured to associate the user specific identifier with the user agnostic identifier in response to the user interaction. The interface element can be configured to provide the user agnostic identifier to a resource that offers options, based on the user agnostic identifier, for accessing one or more items of media based on relevancy of the items of the media to a user context. In one aspect, the interface element can comprise one or more fields and/or attributes comprising the user information, user agnostic identifier, keywords, and/or the like.

Figure 9:
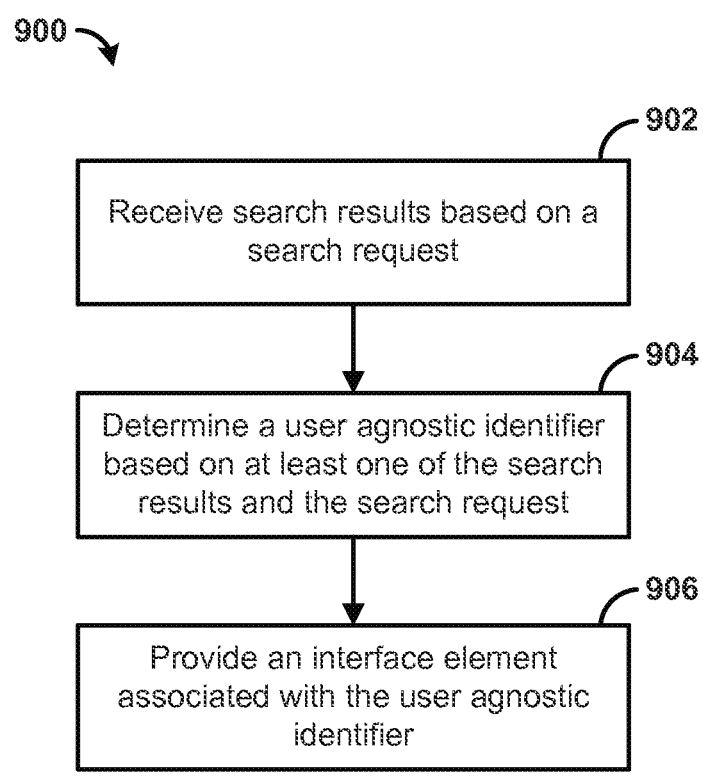
FIG. 9 is a flowchart of another example method for implementing one or more features of the disclosure

FIG. 9 is a flowchart illustrating an example method 900 for implementing one or more features of the disclosure. At step 902, search results can be received based on a search request. For example, the search query can be received from a social media page or other user interface. At step 904, a user agnostic identifier can be determined based on at least one of the search results and the search request. The user agnostic identifier can be configured to identify content and/or a collection of content. In one aspect, determining the user agnostic identifier based on at least one of the search results and the search request can comprise analyzing textual content in at least one of the search query and the search results. For example, natural language processing can be performed to identify one or more keywords (e.g., descriptive terms). A database, index, and/or the like can be queried to obtain a user agnostic identifier matching the keywords. In another aspect, the user agnostic identifier can comprise one or more of the identified one or more keywords.

At step 906, an interface element associated with the user agnostic identifier can be provided. The interface element can provide the user agnostic identifier to a resource configured to identify content items based on user context of a user from the collection of content. The interface element can comprise a user-selectable button. The interface element can be configured to provide the user agnostic identifier and user information to a content provider in response to an interaction with the interface element by a user. In one aspect, the user context can comprise a time associated with an interaction with the interface element by the user. In another aspect, the content items can be ranked based on relevancy to the user. In one aspect, the interface element can comprise one or more fields and/or attributes comprising the user information, user agnostic identifier, keywords, and/or the like.

Figure 10:
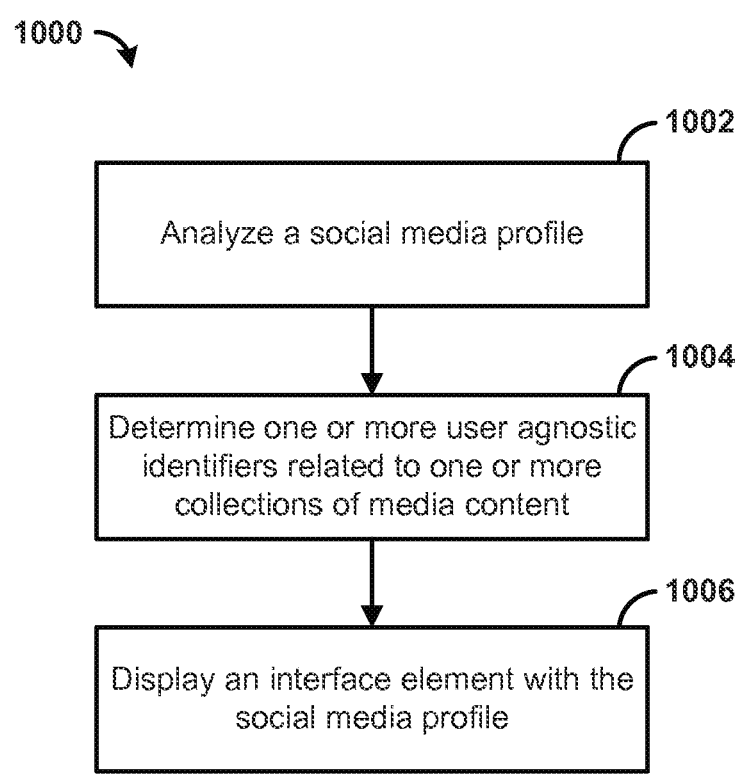
FIG. 10 is a flowchart of another example method for implementing one or more features of the disclosure.

FIG. 10 is a flowchart illustrating an example method 1000 for implementing one or more features of the disclosure. At step 1002, a social media profile can be analyzed. In one aspect, the analyzing the social media profile can comprise determining textual content of the social media profile. For example, analyzing the social media profile can comprise performing natural language processing to the textual content. At step 1004, one or more user agnostic identifiers related to one or more collections of media content can be determined based on the analysis of the social media profile. In one aspect, the one or more user agnostic identifiers can comprise an identifier configured to identify one or more items of the media content. For example, natural language processing can be performed to identify one or more keywords (e.g., descriptive terms). A database, index, and/or the like can be queried to obtain a user agnostic identifier matching the keywords. In another aspect, the user agnostic identifier can comprise one or more of the identified one or more keywords.

At step 1006, an interface element can be displayed with the social media profile. The interface element can be associated with the user agnostic identifier. The interface element can comprise a user-selectable button. The interface element can be associated with a first user specific identifier indicative of a user associated with the social media profile. The interface element can be configured to provide access to one or more content options associated with the usage agnostic identifier. In one aspect, the interface element can comprise one or more fields and/or attributes comprising the user information, user agnostic identifier, keywords, and/or the like.

Figure 11:
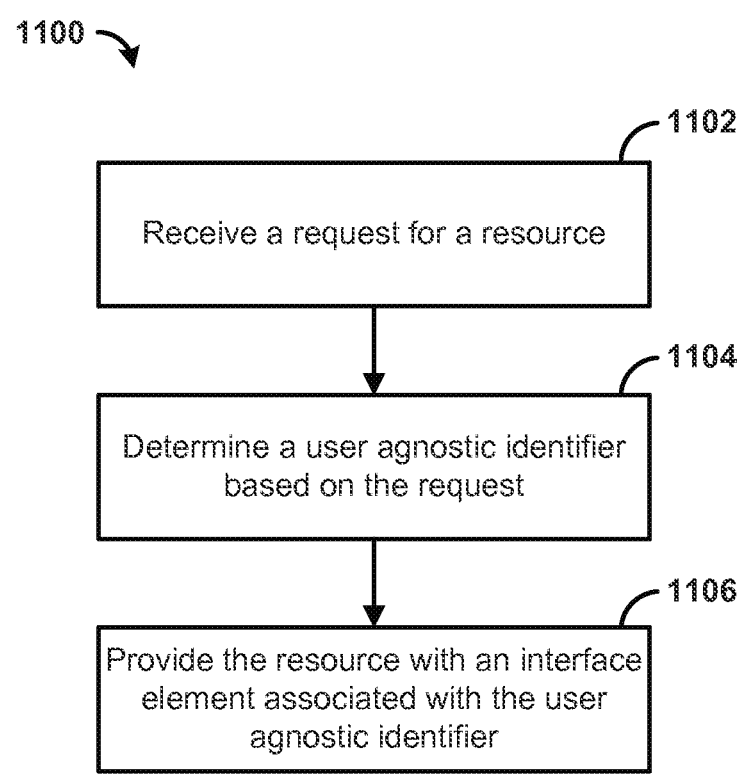
FIG. 11 is a flowchart of another example method for implementing one or more features of the disclosure.

FIG. 11 is a flowchart illustrating an example method 1100 for implementing one or more features of the disclosure. At step 1102, a request for a resource can be received. For example, the resource can comprise a social media profile, web site, user interface, a portion thereof, and/or the like. At step 1104, a user agnostic identifier can be determined based on the request. In one aspect, determining a user agnostic identifier based on the request can comprise analyzing textual content of the request. The user agnostic identifier can be further determined based on the textual content of the resource. For example, natural language processing can be performed to identify one or more keywords (e.g., descriptive terms). A database, index, and/or the like can be queried to obtain a user agnostic identifier matching the keywords. In another aspect, the user agnostic identifier can comprise one or more of the identified one or more keywords.

At step 1106, the resource can be provided with an interface element associated with the user agnostic identifier. The interface element can comprise, for example, a user-selectable button, window, link, box, and/or the like. The interface element can be configured to provide the user agnostic identifier and user information to a content provider in response to an interaction with the interface element by a user. For example, the interface element can comprise one or more fields and/or attributes comprising the user information, user agnostic identifier, keywords, and/or the like. The interface element can comprise and/or be associated with computer readable code configured to transmit the user information, user agnostic identifier, and/or the like in response to an interaction (e.g., click, hover) with the interface element. In one aspect, providing the resource with the interface element can comprise inserting the interface element into the social media profile. For example, a website, social media profile, window, box, and/or the like can be updated by adding the interface element.

Figure 12:
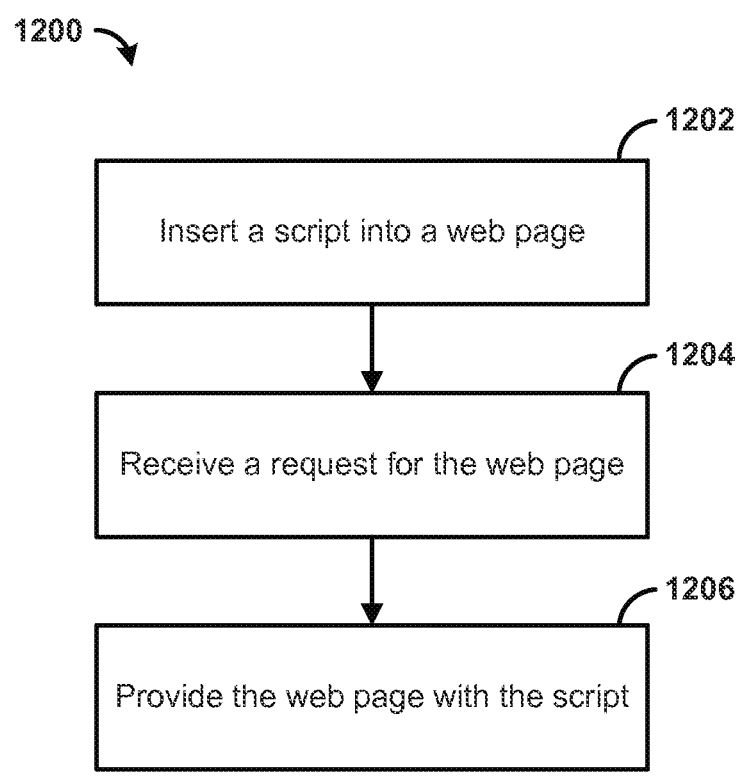
FIG. 12 is a flowchart of another example method for implementing one or more features of the disclosure.

FIG. 12 is a flowchart illustrating an example method 1200 for implementing one or more features of the disclosure. At step 1202, a script can be inserted into a web page. The script can be a script configured such that one or more content providers (e.g., web page publishers) can insert the script into one or more web pages. For example, the web page can comprise a social media profile, search page, web portal, message box, and/or the like. At step 1204, a request for the web page can be received. For example, the request can be received from a user device operated by a user. The request can comprise a request formatted according to hypertext transfer protocol, and/or the like.

At step 1206, the web page can be provided with the script. The script can be configured to add an interface element to the web page based on textual content of the web page. For example, the script can be configured to perform (e.g., or request a remove device to perform) natural language processing to identify one or more keywords (e.g., descriptive terms). A database, index, and/or the like can be queried by the script (e.g., or the remote device) to obtain a user agnostic identifier matching the keywords. In another aspect, the user agnostic identifier can comprise one or more of the identified one or more keywords.

The interface element can be associated with a user agnostic identifier associated with a collection of content relevant to the textual content of the web page. The collection can comprise one or more episodes of a show, content grouped by keyword (e.g., genre, actor, actress, director, channel), and/or the like. The interface element can comprise a user-selectable button, window, link, box, and/or the like. The interface element can be configured to associate the user agnostic identifier with user information related to a user interacting with the interface element. The user information can comprise a user specific identifier (e.g., account identifier, network address). In one aspect, the interface element can be configured to provide the user agnostic identifier and user information to a content provider in response to an interaction with the interface element by a user. For example, the interface element can provide the user agnostic information and/or user information to an intermediary server configured to locate relevant content (e.g., content relevant to, and/or associated with the user agnostic identifier and/or user information) at one or more content providers. In another aspect, the script can be configured to detect user information associated with a user accessing the web page. For example, the script can be configured to access network address information, user information in a cookie, user information provided by the user, account information tracked by the webpage and/or server hosting the web page, and/or the like. The script can be configured to customize the interface element to a user based on the detected user information.

Figure 13:
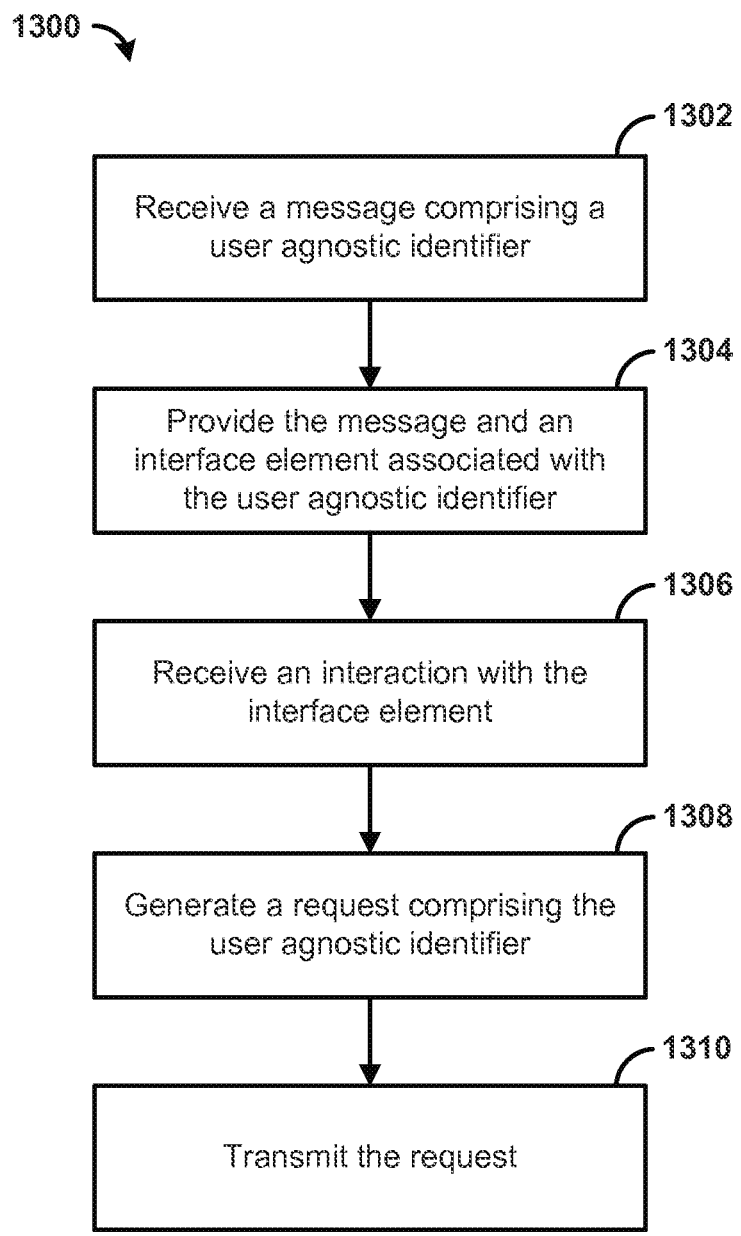
FIG. 13 is a flowchart of another example method for implementing one or more features of the disclosure.

FIG. 13 is a flowchart illustrating an example method 1300 for implementing one or more features of the disclosure. At step 1302, a message comprising a user agnostic identifier can be received. For example, the message can comprise a post, status update, private message, and/or the like provided to a device (e.g., social media server). The message can be received from a first user. In one aspect, the message can comprise textual content associated with media content. The media content can comprise one or more of audio and video, such as a movie, episode of a show, a show, program, sportscast, audio stream, video stream, content grouped by a common keyword, and/or the like. The user agnostic identifier can comprise an identifier configured to identify the media content. In one aspect, the message can comprise a first user specific identifier. The first user specific identifier can be configured to identify the first user originating the message.

At step 1304, the message and an interface element associated with the user agnostic identifier can be provided. For example, the interface element can comprise a user-selectable button, window, link, box, and/or the like. For example, a content device receiving the message can insert (e.g., automatically or by user request) the interface element into the message. At step 1306, an interaction with the interface element can be received. For example, the interaction can be received from the first user and/or a second user receiving the message. At step 1308, a request comprising the user agnostic identifier can be generated. In one aspect, the request can further comprise the first user specific identifier and/or a second user specific identifier. The second user specific identifier can be configured to identify the second user receiving the message. At step 1310, the request can be transmitted. The request can be transmitted with time information indicative of a time the interaction with the interface element was received. The request can be transmitted to an intermediary device configured to provide one or more content options for accessing one or more items of the media content at one or more devices from one or more content providers.

Figure 14:
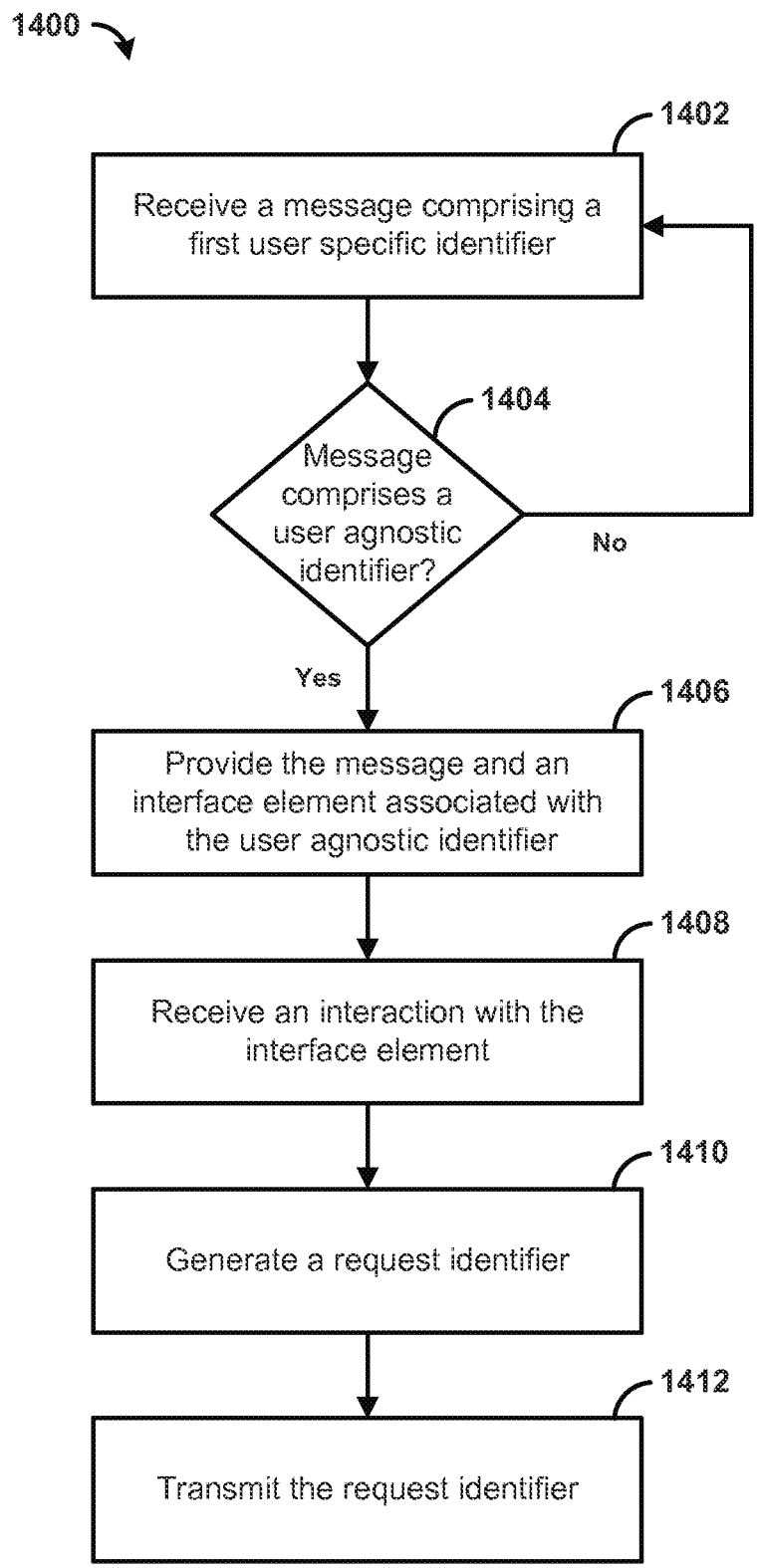
FIG. 14 is a flowchart of another example method for implementing one or more features of the disclosure.

FIG. 14 is a flowchart illustrating an example method 1400 for implementing one or more features of the disclosure. At step 1402, a message comprising a first user specific identifier can be received. In one aspect, the message can comprise textual content associated with media content. The media content can comprise one or more of audio and video. The first user specific identifier can be configured to identify a first user originating the message.

At step 1404, it can be determined if the message comprises a user agnostic identifier. In one aspect, the natural language processing can be performed on the textual content to identify the user agnostic identifier. In one aspect, the user agnostic identifier can be identified based on a sequence, symbol, code, keyword, and/or the like. The user agnostic identifier can comprise an identifier configured to identify the media content. For example, the user agnostic identifier can comprise a keyword indicative of the content, such as title, actor, actress, director, series identifier, unique content identifier, genre, and/or the like. If the message comprises a user agnostic identifier, then the method 1400 can proceed to step 1406. If the message does not comprise a user agnostic identifier, the method 1400 can return to step 1402. At step 1406, the message and an interface element associated with the user agnostic identifier can be provided. The interface element can comprise a user-selectable button. In one aspect, the interface element can comprise one or more fields and/or attributes comprising user information, the user agnostic identifier, keywords, and/or the like.

At step 1408, an interaction with the interface element can be received. At step 1410, a request identifier can be generated based on user information, such as a first user specific identifier and a second user specific identifier, and/or other information, such as the user agnostic identifier. The request identifier can be generated based one or more fields and/or attributes associated with the interface element. In one aspect, the request identifier can be generated at a remote device based on a request for the request identifier. The second user specific identifier can be configured to identify a second user receiving the message. The request identifier can be transmitted with time information indicative of a time the interaction with the interface element was received. At step 1412, the request identifier can be transmitted. The request identifier can be transmitted to an intermediary device configured to provide one or more content options for accessing one or more items of the media content at one or more devices from one or more content providers.

Figure 15:
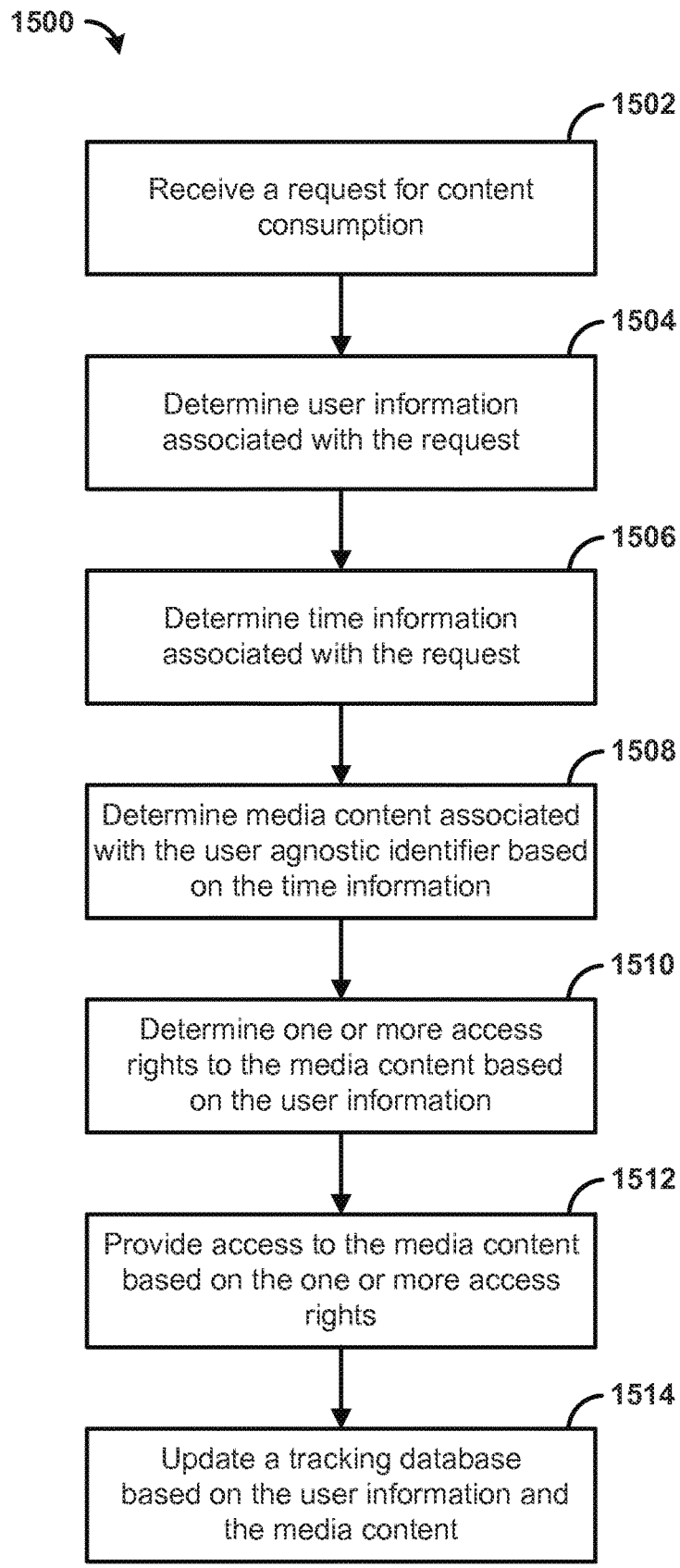
FIG. 15 is a flowchart of another example method for implementing one or more features of the disclosure.

FIG. 15 is a flowchart illustrating an example method 1500 for implementing one or more features of the disclosure. At step 1502, a request for content consumption can be received. The request can comprise a user agnostic identifier. The user agnostic identifier can comprise a unique identifier, and/or a keyword configured to identify a collection of content (e.g., based on genre, actor, actress, director, channel, episodes of show, and/or the like). The request can be based on a message. For example, the message can be a message on a social media page, post, status update, text message, private message, and/or the like. In one aspect, the request can comprise a first user specific identifier configured to identify a first user originating the message. The first user specific identifier can comprise a name, account identifier, or other user identification information. The request can comprise a second user specific identifier configured to identify a second user receiving the message. The second user specific identifier can comprise a name, account identifier, or other user identification information.

At step 1504, user information associated with the request can be received. The user information can be determined based on the first user specific identifier, second user specific identifier, and/or the like. In one aspect, determining user information can comprise receiving the user information from a social media message, user tracking data, a user login, and/or the like. At step 1506, time information associated with the request can be determined. In one aspect, time information can comprise at least one of a time the request is received and a time the request is initiated by a user. The time information can comprise a current time.

At step 1508, media content associated with the user agnostic identifier can be determined based on the time information. For example, the user agnostic identifier can comprise an identifier (e.g., unique identifier, keyword) configured to identify the media content. In one aspect, determining media content associated with the user agnostic identifier based on the time information can comprise determining media content that is available at the current time. In another aspect, determining media content associated with the user agnostic identifier based on the time information can comprise determining media content that is available during a time span indicated by the time information.

At step 1510, one or more access rights to the media content can be determined based on the user information. For example, the one or more access rights can be determined based on a subscription tier, purchase history, preferences, blackout information, content license restrictions, and/or the like. At step 1512, access to the media content can be provided based on the one or more access rights. Providing access to the media content can comprise providing a link to a source of the video content. In one aspect, providing access to the media content can be customized based on the user information. For example, options to access the media content can be provided to a user if the user has access rights to access the media content via these options. If the user does not have rights to access the content, the option can be to purchase rights to access the content from one or more content providers. At step 1514, a tracking database can be updated based on the user information and the media content. The tracking database can be configured to provide statistical information regarding media content consumption. For example, an entry can be added to the database indicating that a user requested, accessed, or otherwise interacted with the media content. The entry can comprise the user agnostic identifier, and user information, such as the first user specific identifier and second user specific identifier.

Figure 16:
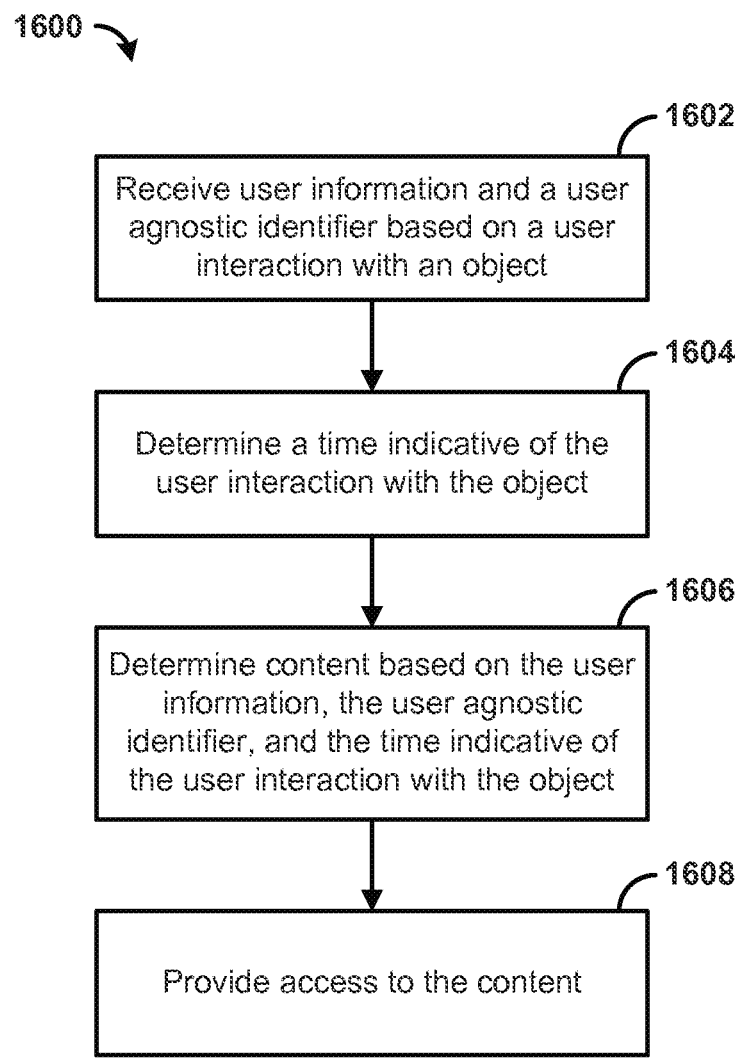
FIG. 16 is a flowchart of another example method for implementing one or more features of the disclosure.

FIG. 16 is a flowchart illustrating an example method 1600 for implementing one or more features of the disclosure. At step 1602, user information and a user agnostic identifier can be received based on a user interaction with an object. The object can comprise an interface element (e.g., user-selectable button, window, box, link, image, video preview) associated with the user agnostic identifier. The interface element can be configured to associate the user information with the user agnostic identifier in response to the user interaction. For example, the object can be provided on a social media feed, web page, application, and/or other user interface. In one aspect, receiving the user information and the user agnostic identifier based on the user interaction with the object can comprise receiving the user information based on a user login. The user login can be provided to a user based on the user interaction.

At step 1604, a time indicative of the user interaction with the object can be determined. The time can be based on a time zone in which the user causing the user interaction is located. At step 1606, content can be determined based on the user information, the user agnostic identifier, and the time indicative of the user interaction with the object. Determining content based on the user information and the user agnostic identifier can comprise determining, from a specified content provider, content associated with the user agnostic identifier that is available to a user associated with the user information. As another example, determining content based on the user information and the user agnostic identifier can comprise ranking content based on how a user accessing the content will affect a content viewership rating and selecting highest ranking content from the ranked content. As another example, determining content can comprise determining one or more content sources associated with the user information and selecting the content from the one or more content sources based on the user agnostic identifier and the time indicative of the user interaction with the object. The one or more content sources can comprise at least one of a digital video recording device, a content storage device, a content provider, and/or the like.

At step 1608, access can be provided to the content. In one aspect, providing access to the content can comprise providing an access element configured to provide access to the content. The access element can be configured to at least one of schedule a reminder to view the content at a specified time, schedule a recording of the content, display the content in a mobile application, display the content in a web application, provide an invitation to install an application for providing the content, and tune a device to the content. The access element can comprise a link, window (e.g., viewing window), button, application, box, and/or the like (e.g., configured to point or direct a user to a content provider or a source of the content. For example, the access element can comprise a list of resource locators, links, scripts configured to launch an application or open a window, and/or the like.

Figure 17:
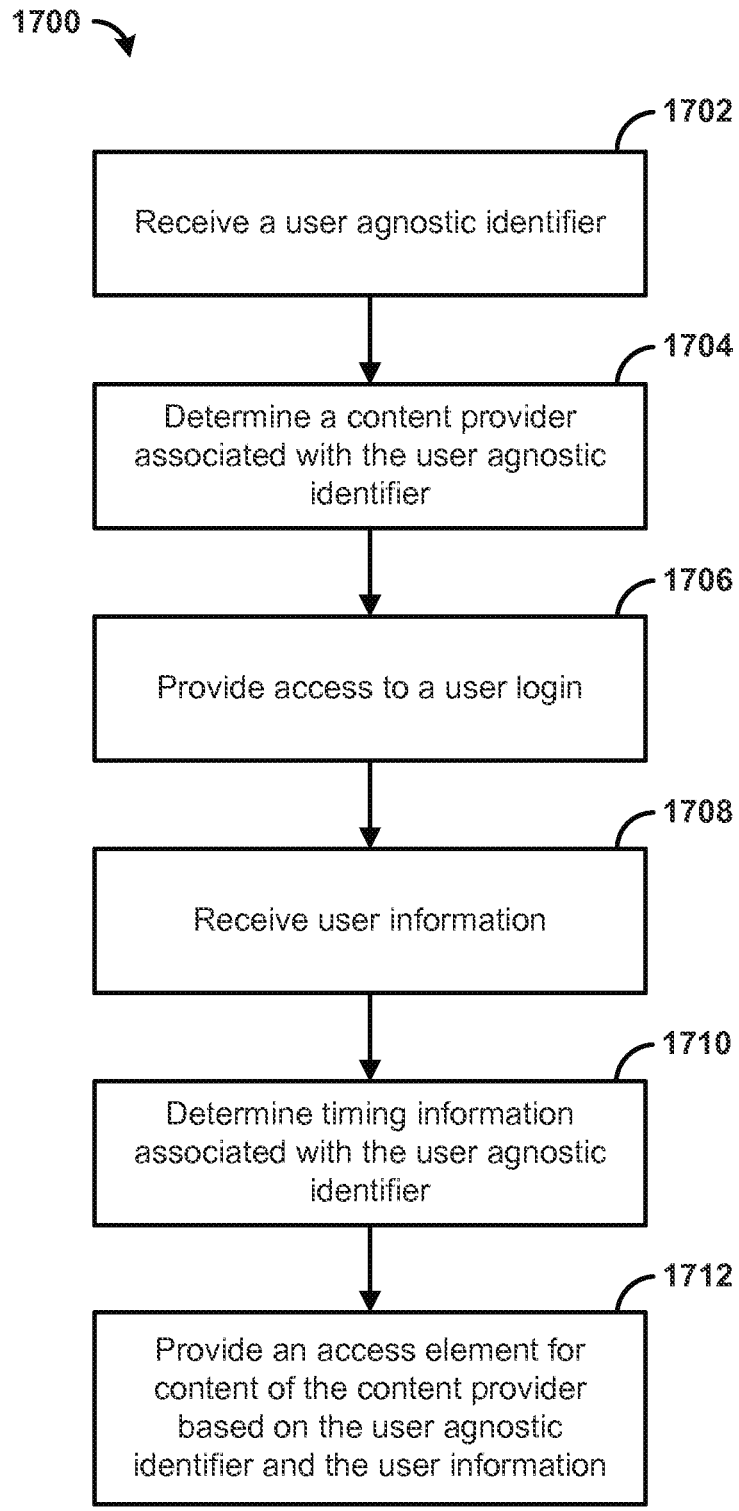
FIG. 17 is a flowchart of another example method for implementing one or more features of the disclosure.

FIG. 17 is a flowchart illustrating an example method 1700 for implementing one or more features of the disclosure. At step 1702, a user agnostic identifier can be received. As an example, the user agnostic identifier can be received based on an interaction (e.g., click, hover, press) with an interface element associated with the user agnostic identifier. As another example, the user information can be received based on the interaction with the interface element associated with the user agnostic identifier. The interface element can be configured to associate the user information with the user agnostic identifier in response to the user interaction. The interface element can be provided on a social media feed. For example, the interface element can comprise one or more fields, attributes, and/or the like configured to store information (e.g., user agnostic identifier, user specific identifiers). The interface element can comprise and/or be associated with a script (e.g., computer readable code) configured to associate the stored information with the user information. For example, the user information and user agnostic identifier can be associated by including the user information and user agnostic identifier together in a request, message, notification, and/or the like initiated in response to an interaction with the interface element.

At step 1704, a content provider associated with the user agnostic identifier can be determined. In one aspect, determining the content provider associated with the user agnostic identifier can comprise providing the user agnostic identifier to at least one content provider. At step 1706, access to a user login can be provided. The user login can be configured to accept user information (e.g., password, name) from a user. At step 1708, user information can be received. For example, the user information can be received based on user input to the user login. At step 1710, timing information associated with the user agnostic identifier can be determined. The content can be selected based on the timing information. The timing information can be based on a time zone in which a user associated with the user information is located. The timing information can comprise a current time, time of interaction, time of receiving a message, notification, and/or request associated with the notification.

At step 1712, an access element for content of the content provider can be provided based on the user agnostic identifier and the user information. The access element can be configured to provide access to content that is associated with the user agnostic identifier. For example, the content can be available to a user based on access rights associated with the user information. In one aspect, the access element can be configured to at least one of schedule a reminder to view the content at a specified time, schedule a recording of the content, display the content in a mobile application, display the content in a web application, provide an invitation to install an application for providing the content, and tune a device to the content. In one aspect, providing the access element for content of the content provider based on the user agnostic identifier and the user information can comprise ranking content based on how a user accessing the content will affect a content viewership rating and selecting highest ranking content from the ranked content. The access element can be configured to allow a user to at least one of comment on the content, review the content, rank the content, share the content, bookmark the content, and favorite the content. The access element can comprise a menu, link, window (e.g., viewing window), button, application, box, and/or the like. For example, the access element can comprise a list of resource locators, links, scripts configured to launch an application or open a window, and/or the like.

Figure 18:
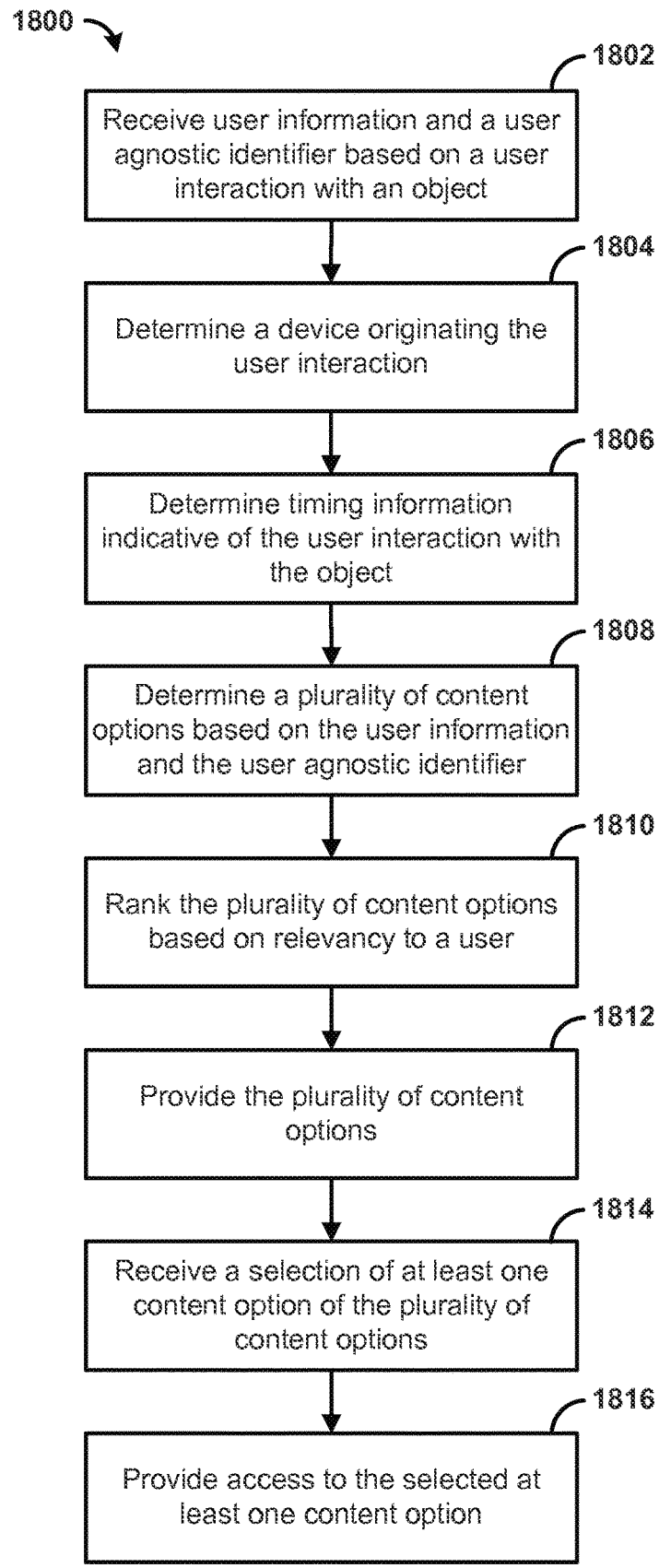
FIG. 18 is a flowchart of another example method for implementing one or more features of the disclosure.

FIG. 18 is a flowchart illustrating an example method 1800 for implementing one or more features of the disclosure. At step 1802, user information and a user agnostic identifier can be received based on a user interaction with an object. The object can comprise an interface element associated with the user agnostic identifier. The interface element can be configured to associate the user information with the user agnostic identifier in response to the user interaction. For example, the object can be provided on a social media feed. At step 1804, a device originating the user interaction can be determined. The device can comprise a user device. The user device can access a remote server, such as a social media server. At step 1806, timing information indicative of the user interaction with the object can be determined. The timing information can be based on a time zone in which a user associated with the user information is located. The timing information can comprise a current time, time of interaction, time of receiving notice of the interaction, and/or the like.

At step 1808, a plurality of content options can be determined based on the user information and the user agnostic identifier. In one aspect, determining the plurality of content options based on the user information and the user agnostic identifier can comprise determining, from a specified content provider, content associated with the user agnostic identifier that is available to a user associated with the user information. In another aspect, determining the plurality of content options based on the user information and the user agnostic identifier can comprise ranking content based on how a user accessing the content will affect a content viewership rating and selecting highest ranking content from the ranked content. The plurality of content options can be further determined based on the timing information and/or based on the device originating the user interaction.

At step 1810, the plurality of content options can be ranked based on relevancy to a user. For example, content options that are accessible to a user based on timing information, access rights, and/or the like can be ranked higher than other content options (e.g., requiring purchase or scheduling of future access and/or reminds). At step 1812, the plurality of content options can be provided. The highest ranked content option can be distinguished from remaining content options. For example, the highest ranked content option can be highlighted, set apart, or otherwise indicated. At step 1814, a selection of at least one content option of the plurality of content options can be received. For example, a user can select at least one of the plurality of content options.

At step 1816, access to the selected at least one content option can be provided. In one aspect, providing access to the selected at least one content option can comprise providing an access element configured to provide access to the at least one content option. The access element can be configured to at least one of schedule a reminder to view the at least one content option at a specified time, schedule a recording of the at least one content option, display the at least one content option in a mobile application, display the content in a web application, provide an invitation to install an application for providing the content, and tune a device to the at least one content option. The access element can comprise a menu, link, window (e.g., viewing window), button, application, box, and/or the like. For example, the access element can comprise a list of resource locators, links, scripts configured to launch an application or open a window, and/or the like.

Figure 19:
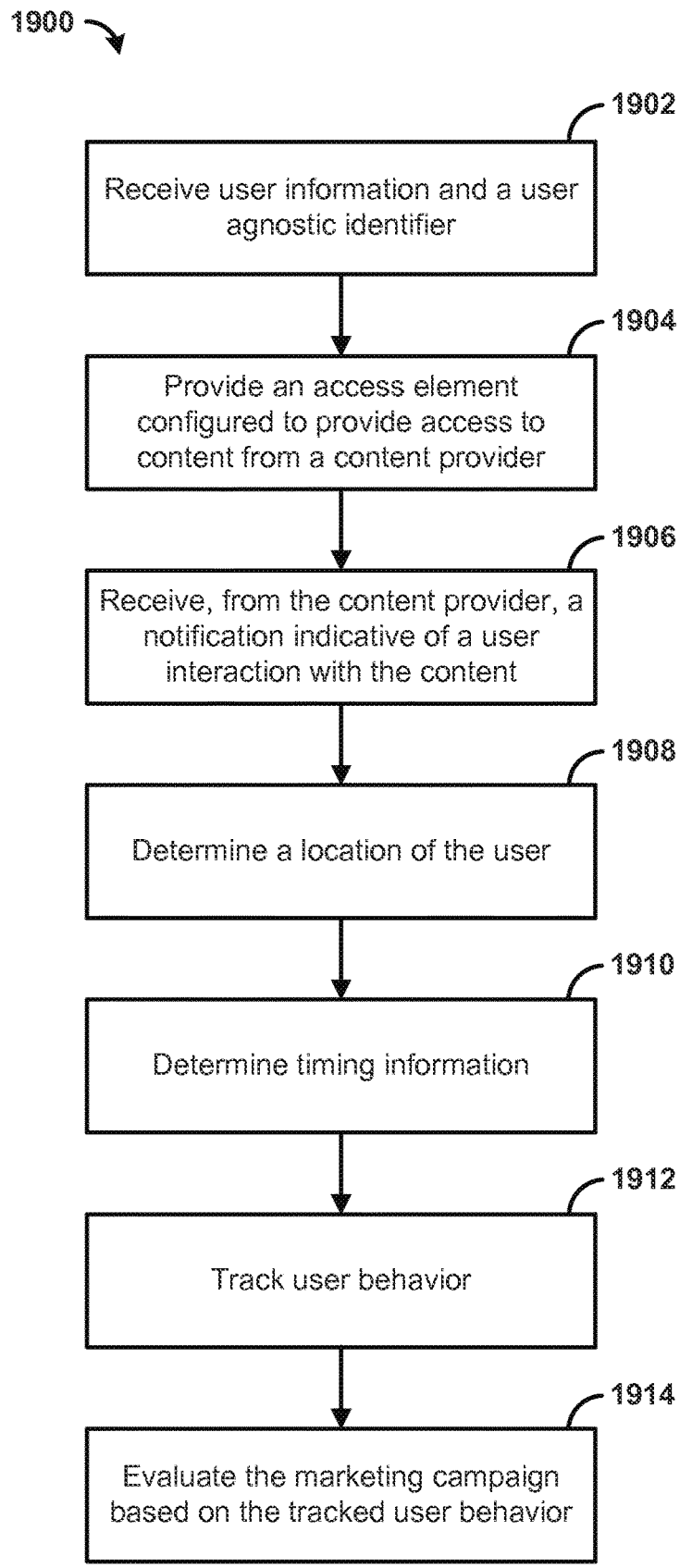
FIG. 19 is a flowchart of another example method for implementing one or more features of the disclosure.

FIG. 19 is a flowchart illustrating an example method 1900 for implementing one or more features of the disclosure. At step 1902, user information and a user agnostic identifier can be received. For example, receiving the user information and the user agnostic identifier is can be received based on at least one of a user interaction with an interface element, a user login, and user tracking data. For example, the interface element can be provided on a social media feed. The user agnostic identifier can be associated with a marketing campaign. In one aspect, the user information can comprise first user information (e.g., first user specific identifier) indicative of a first user and second user information (e.g., second user specific identifier) indicative of a second user.

At step 1904, an access element configured to provide access to content from a content provider can be provided based on the user information and the user agnostic identifier. The access element can comprise a menu, link, window (e.g., viewing window), button, application, box, and/or the like. For example, the access element can comprise a list of resource locators, links, scripts configured to launch an application or open a window, and/or the like.

At step 1906, a notification indicative of a user interaction with the content can be received from the content provider based on a user accessing the content. The user interaction can comprise at least one of an interaction with a playback control associated with the content, sharing the content, favoriting the content, bookmarking the content, commenting on the content, reviewing the content, ranking the content, and an interaction ending access to the content.

At step 1908, a location of the user can be determined. The location can be determined based on user information (e.g., account information) provided by the user. The location can be determined based on a network address, global positioning data, and/or the like. The content can be selected based on the location and/or the user behavior can be tracked based on the location.

At step 1910, timing information can be determined. The timing information can be indicative of at least one of the user interaction and a request for content resulting in the receiving of the user information and the user agnostic identifier, wherein at least one of, the access element is provided based on the timing information and the notification comprises the timing information. The timing information can be based on a time zone of a user (e.g., first user, second user). At step 1912, user behavior can be tracked based on at least one of the user information, the user agnostic identifier, the access element, and the notification. For example, tracking user behavior can comprise generating an event history associated with the user information and the user agnostic identifier. At step 1914, the marketing campaign can be evaluated based on the tracked user behavior.

Figure 20:
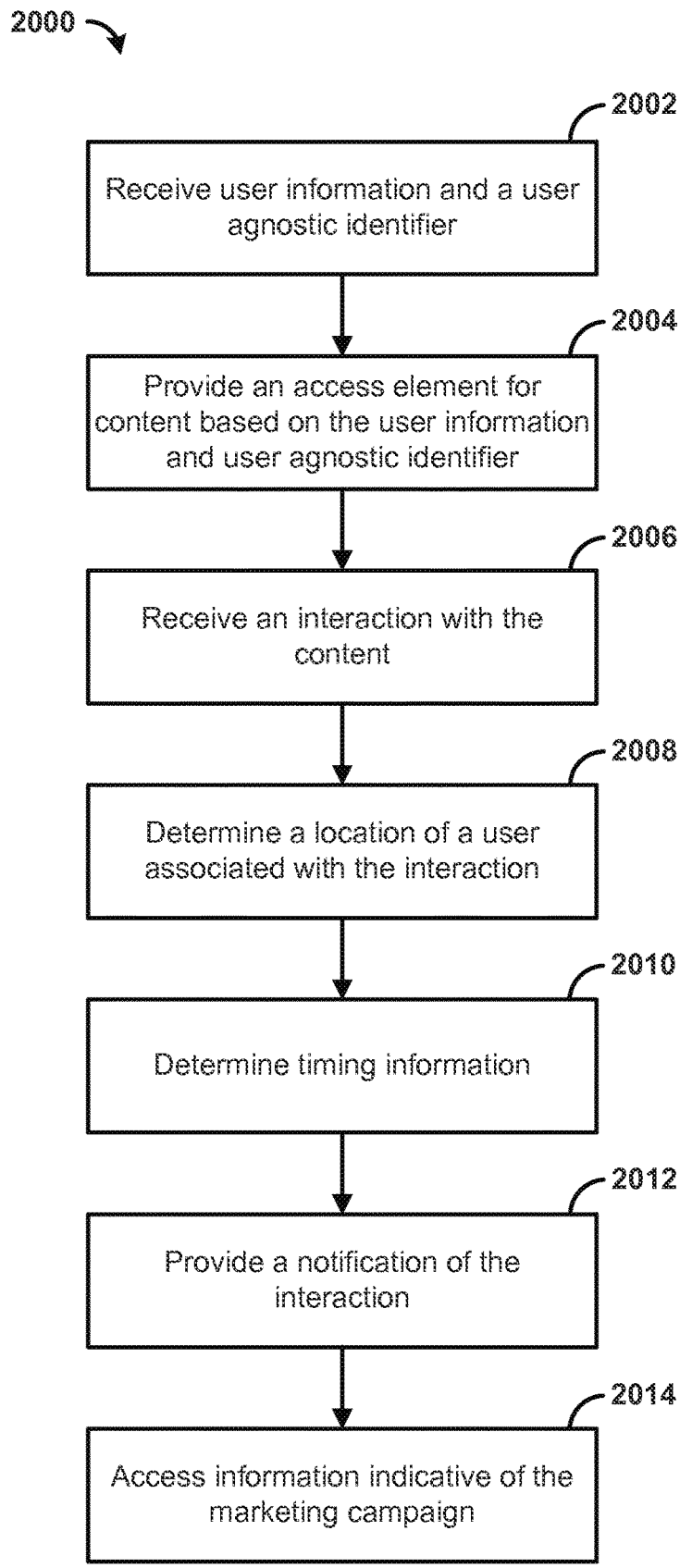
FIG. 20 is a flowchart of another example method for implementing one or more features of the disclosure.

FIG. 20 is a flowchart illustrating an example method 2000 for implementing one or more features of the disclosure. At step 2002, user information and a user agnostic identifier can be received. For example, the user information and the user agnostic identifier can be received based on at least one of a user interaction with an interface element, a user login, and user tracking data (e.g., cookie, server side tracking). The interface element can be provided on a social media feed. For example, the interface element can be provided with a post, status update, message, and/or the like. In one aspect, the user agnostic identifier can be associated with a marketing campaign.

At step 2004, an access element for content can be provided based on the user information and user agnostic identifier. The access element can comprise a menu, link, window (e.g., viewing window), button, application, box, and/or the like. For example, the access element can comprise a list of resource locators, links, scripts configured to launch an application or open a window, and/or the like.

At step 2006, an interaction with the content can be received. The interaction with the content can comprise at least one of an interaction with a playback control associated with the content, sharing the content, favoriting the content, bookmarking the content, commenting on the content, reviewing the content, ranking the content, and an interaction ending access to the content. The interaction with the content can comprise an interaction with an advertisement provided with the content. At step 2008, a location of a user associated with the interaction can be determined. The location can be determined based on user information (e.g., account information) provided by the user. The location can be determined based on a network address, global positioning data, and/or the like. The content can be selected based on the location.

At step 2010, timing information can be determined. The timing information can be indicative of at least one of the interaction and a request for content resulting in the receiving of the user information and the user agnostic identifier. The timing information can be based on a time zone of a user (e.g., first user, second user). The content can be selected based on the timing information and/or a notification can comprise the timing information. At step 2012, the notification of the interaction can be provided. For example, a content provider can provide the notification to an intermediary device, tracking server, an internal service, and/or the like. At step 2014, information indicative of the marketing campaign can be accessed. The information indicative of the marketing campaign can be based on the notification. For example, information indicative the marketing campaign can comprise statistics, such as number of views, number of a particular type of interaction with content, features of users accessing content, source (e.g., social media accounts) of access to content, and/or the like.

Figure 21:
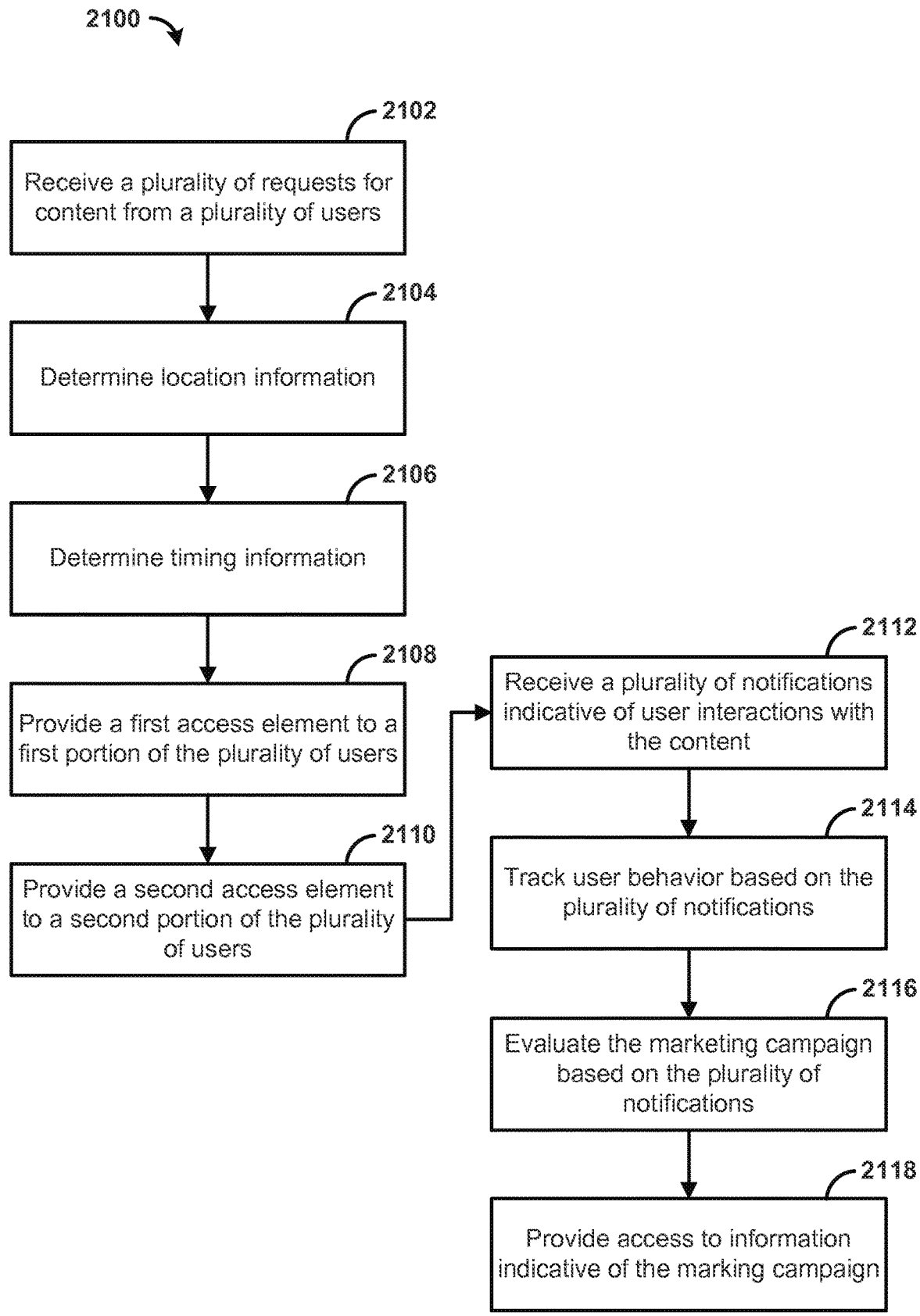
FIG. 21 is a flowchart of another example method for implementing one or more features of the disclosure.

FIG. 21 is a flowchart illustrating an example method 2100 for implementing one or more features of the disclosure, such as providing content. Content can comprise audio, video, text (e.g., articles), movies, shows, sportscasts, newscasts, programs, and/or the like. At step 2102, a plurality of requests for content can be received from a plurality of users based on an interface element configured to provide a user agnostic identifier and user information. The interface element can comprise a button, link, window, box, and/or the like. The interface element can be provided on a web page, such as a social media page. The user agnostic identifier can be associated with a marketing campaign. The interface element can be provided on a social media feed.

At step 2104, location information associated with at least one of the plurality of users can be determined. The first access element can be selected based on the location information. The location can be determined based on user information (e.g., account information) provided by the user. The location can be determined based on a network address, global positioning data, and/or the like.

At step 2106, timing information can be determined. The timing information can be indicative of at least one of a user interaction and a request for content. The first access element can be provided based on the timing information and/or a notification can comprise the timing information. The timing information can be based on a time zone of a user (e.g., first user, second user).

At step 2108, a first access element can be provided to a first portion of the plurality of users to access the content from a first content provider. At step 2110, a second access element can be provided to a second portion of the plurality of users to access the content from a second content provider. The first access element and/or second access element can comprise a menu, link, window (e.g., viewing window), button, application, box, and/or the like. For example, the first access element and/or second access element can comprise a list of resource locators, links, scripts configured to launch an application or open a window, and/or the like.

At step 2112, a plurality of notifications indicative of user interactions with the content can be received from at least one of the first content provider and second content provider. The user interactions can comprise at least one of an interaction with a playback control associated with the content, sharing the content, favoriting the content, bookmarking the content, commenting on the content, reviewing the content, ranking the content, and an interaction ending access to the content. At least one of the plurality of notifications can be associated with at least one of the user information and the user agnostic identifier.

At step 2114, user behavior can be tracked based on the plurality of notifications. For example, an entry can be added to a tracking database indicating that a user requested, accessed, or otherwise interacted with the media content. The entry can comprise the user agnostic identifier, and user information, such as a first user specific identifier indicating a user posting the interface element and a second user specific identifier indicating a user interacting with the interface element. At step 2116, the marketing campaign can be evaluated based on the plurality of notifications. For example, various statistics can be determined, such as profitability, number of views, number of a particular type of interaction with content, features of users accessing content, source (e.g., social media accounts) of access to content, and/or the like. At step 2118, access can be provided to information indicative of the marketing campaign. The information can be based on at least a portion of the plurality of notifications. For example, information indicative of the marketing campaign can comprise statistics, such as number of views, number of a particular type of interaction with content, features of users accessing content, source (e.g., social media accounts) of access to content, and/or the like.

Figure 22:
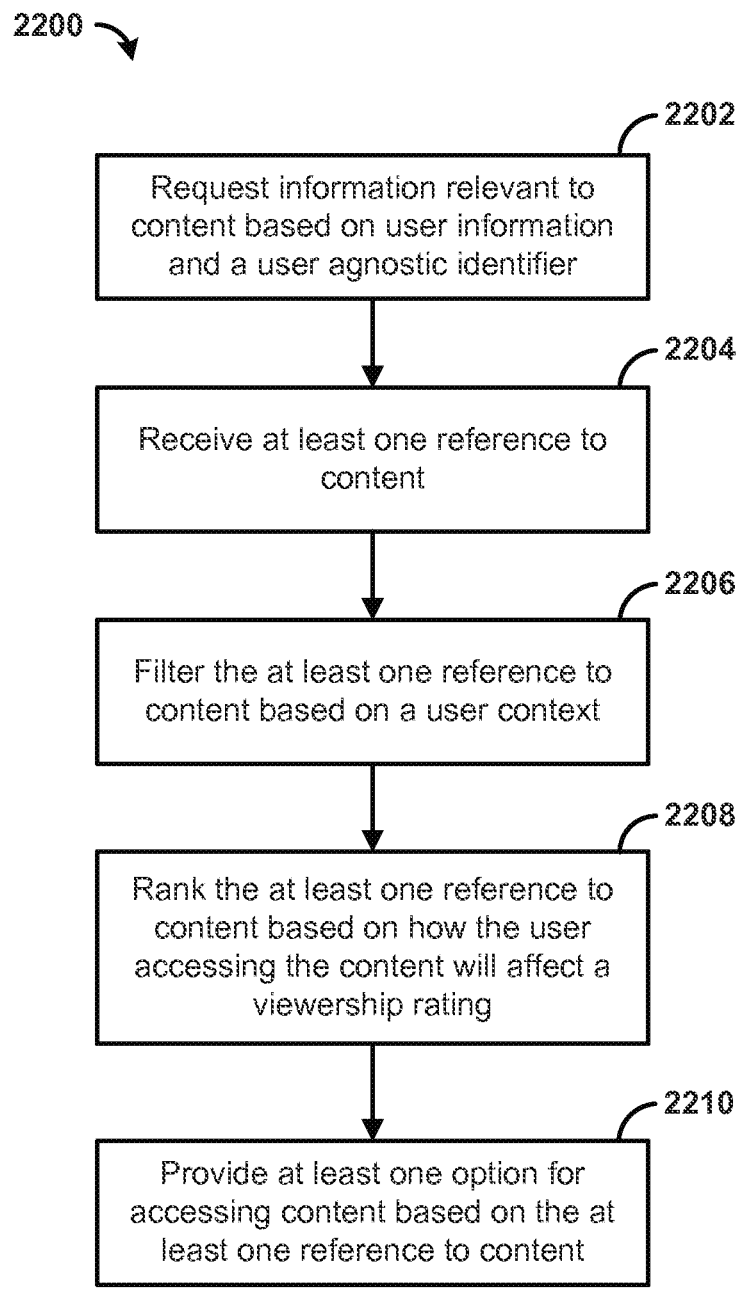
FIG. 22 is a flowchart of another example method for implementing one or more features of the disclosure.

FIG. 22 is a flowchart illustrating an example method 2200 for implementing one or more features of the disclosure. At step 2202, information relevant to content can be requested based on user information and a user agnostic identifier. The user agnostic identifier can define a collection of content based on a hierarchy of identifiers. The user information can comprise one or more user specific identifiers identifying users, such as a user requesting content or a user having social media related to (e.g., promoting, commenting on, posting about, linking to) content.

At step 2204, at least one reference to content can be received. The at least one reference to content can be specific to a content provider. The at least one reference can be indicative of content associated with the user agnostic identifier that is available to a user associated with the user information. In one aspect, receiving at least one reference to content can comprise receiving a call to an application programming interface configured to control a user device. The at least one reference can comprise a resource locator configured to identify a location of content. A resource locator can comprise a link, a script configured to open an application, a script configured to control a remote device (e.g., control a tuner of a set top box), and/or the like.

At step 2206, the at least one reference to content can be filtered based on a user context. The user context can comprise at least one of a user device, a user viewing history, timing information associated with a user, and user entitlement information. Timing information can comprise a current time of a user, a time of a user interaction, a time of receiving a request from a user, and/or the like. Entitlement information can comprise user access rights, such a subscription tier, purchase history, content restrictions (e.g., blackouts, location restrictions), and/or the like.

At step 2208, the at least one reference to content can be ranked based on how the user accessing the content will affect a viewership rating. For example, the viewership rating can comprise a Neilsen rating or other audience tracking system. As another example, if a user accessing the content through a reference to content would increase a viewership rating for content (e.g., prioritized to over other viewership ratings), then a reference to content can be ranked higher.

At step 2210, at least one option for accessing content can be provided based on the at least one reference to content. In one aspect, providing the at least one option for accessing content based on the at least one reference to content can comprise providing a reference to a highest ranked content item of the ranking. The at least one option can be provided to a first device. The at least one option can comprise at least one of an option to access a content item from the first device, an option to access the content item from a second device (e.g., set top box, mobile device), an option to schedule a reminder to access the content item, and an option to schedule a recording of a content item. The at least one option can comprise an option to tune a set top box to the content. In another aspect, providing the at least one option for accessing content based on the at least one reference to content can comprise displaying a list of content available from the content provider.

Figure 23:
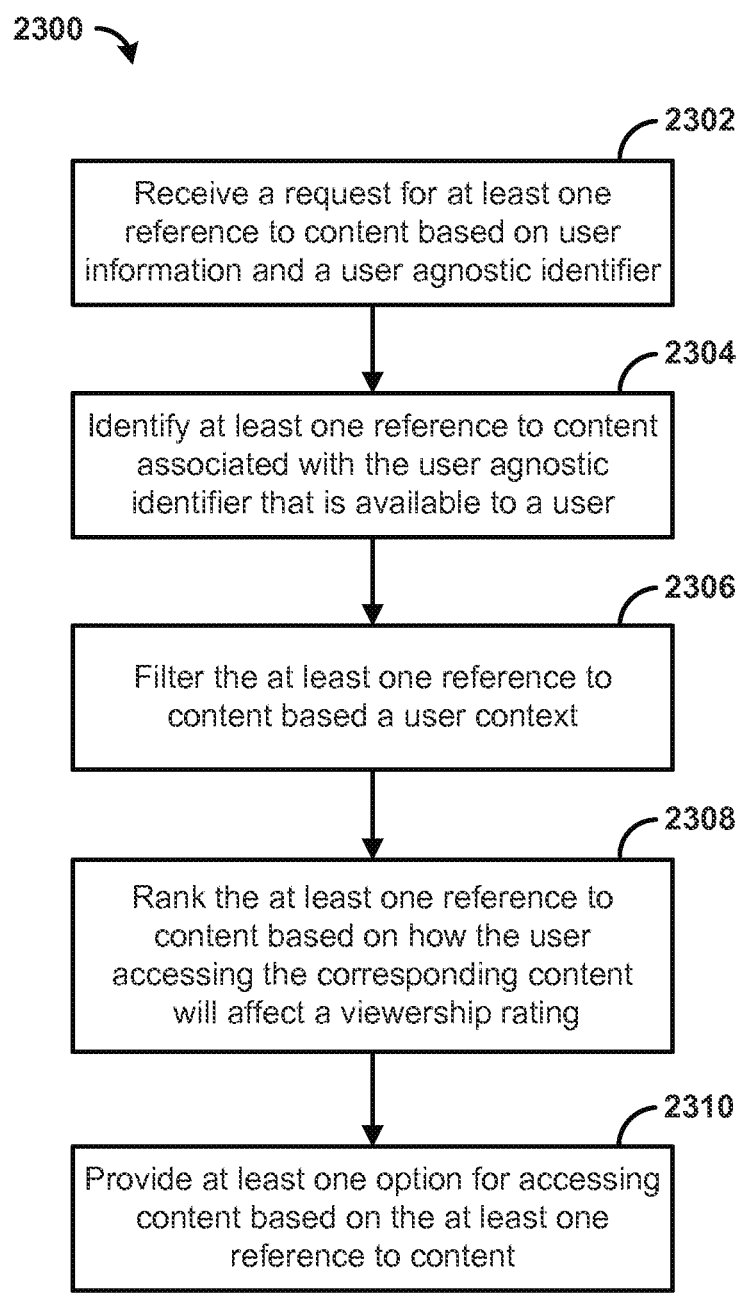
FIG. 23 is a flowchart of another example method for implementing one or more features of the disclosure.

FIG. 23 is a flowchart illustrating an example method 2300 for implementing one or more features of the disclosure. At step 2302, a request for at least one reference to content can be received based on user information and a user agnostic identifier. The user agnostic identifier can define a collection of content based on a hierarchy of identifiers. For example, the user agnostic identifier can comprise a unique identifier associated with a collection of content. As another example, the user agnostic identifier can comprise one or more keywords (e.g., descriptive terms, such as title, actor, actress, genre) indicative of a collection (e.g., grouped previously or in real time based on the one or more keywords) of content.

At step 2304, at least one reference to content can be identified. The at least one reference to content can be associated with the user agnostic identifier that is available to a user associated with the user information. The at least one reference to content can comprise a call to an application programming interface configured to control a user device. The at least one reference can comprise a resource locator configured to identify a location of content. In one aspect, identifying the at least one reference to content can comprise identifying content most relevant to a user based at least one of availability of content associated with the user agnostic identifier and a user context.

At step 2306, the at least one reference to content can be filtered based a user context. The user context can comprise at least one of a user device, a user viewing history, timing information associated with a user, and user entitlement information. Timing information can comprise a current time of a user, a time of a user interaction, a time of receiving a request from a user, and/or the like. Entitlement information can comprise user access rights, such a subscription tier, purchase history, content restrictions (e.g., blackouts, location restrictions), and/or the like.

At step 2308, the at least one reference to content can be ranked based on how the user accessing the corresponding content will affect a viewership rating. For example, the viewership rating can comprise a Neilsen rating or other audience tracking system. As another example, if a user accessing the content through a reference to content would increase a viewership rating for content (e.g., prioritized to over other viewership ratings), then a reference to content can be ranked higher.

At step 2310, at least one option for accessing content can be provided based on the at least one reference to content. In one aspect, providing the at least one option for accessing content can comprise providing highest ranked references to content of the at least one reference to content. The at least one option can be provided to a first device. The at least one option can comprise at least one of an option to access a content item from the first device, an option to access the content item from a second device, an option to schedule a reminder to access the content, and an option to schedule a recording of the content. In another aspect, the at least one option for accessing content can comprise an option to tune a set top box to the content. As another example, providing the at least one option for accessing content based on the at least one reference to content can comprise displaying a list of content available from the content provider.

Figure 24:
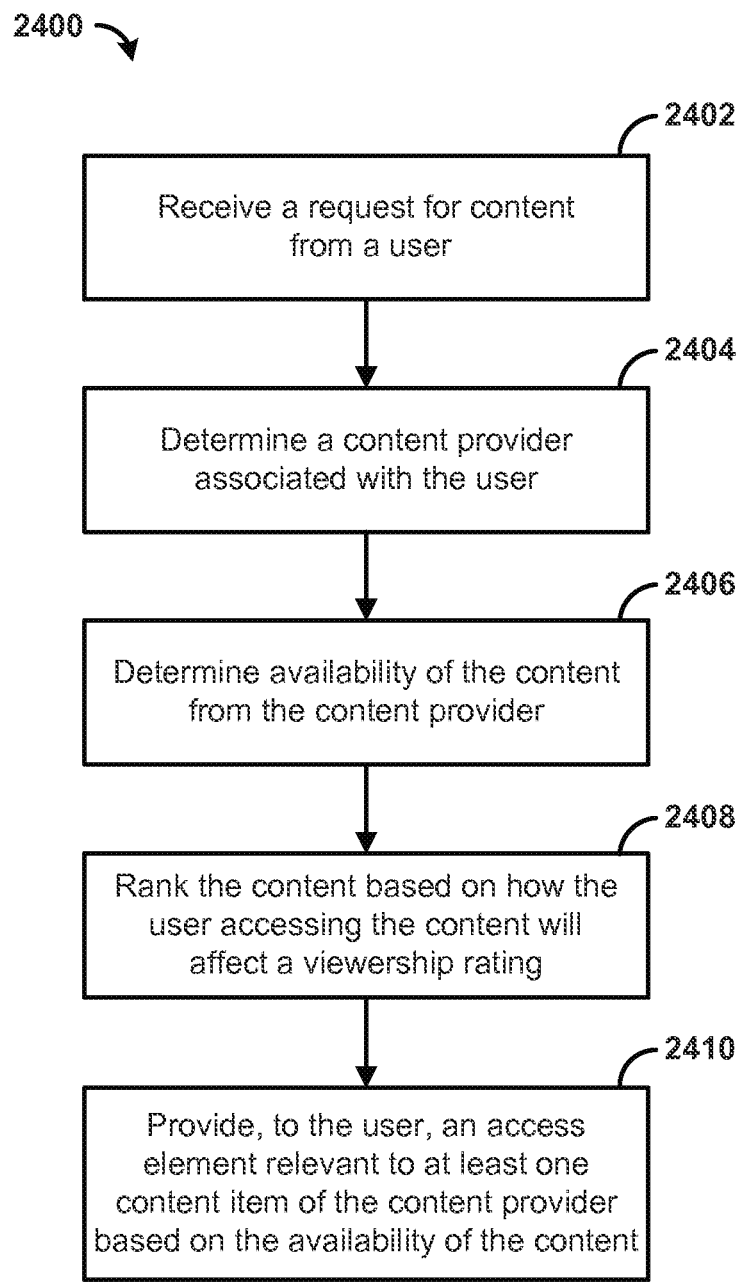
FIG. 24 is a flowchart of another example method for implementing one or more features of the disclosure.

FIG. 24 is a flowchart illustrating an example method 2400 for implementing one or more features of the disclosure. At step 2402, a request for content can be received from a user. Content can comprise a particular content item, a collection of content, a group of content associated based on a common keyword, and/or the like. Content can comprise video, audio, text, movies, television shows, programs, sportscasts, newscasts, and/or the like. At step 2404, a content provider associated with the user can be determined. The content provider can be determined based on user selection, login information, query to the content provider to verify account status, and/or the like.

At step 2406, availability of the content from the content provider can be determined. In one aspect, determining availability of the content can comprise determining a time period of when the content is available to the user. The time period can be compared to a current time, time of user interaction with an interface element, and/or the like.

At step 2408, the content can be ranked based on how the user accessing the content will affect a viewership rating. For example, the viewership rating can comprise a Neilsen rating or other audience tracking system. As another example, if a user accessing the content through a reference to content would increase a viewership rating for content (e.g., prioritized to over other viewership ratings), then a reference to content can be ranked higher.

At step 2410, an access element relevant to at least one content item of the content provider can be provided, to the user, based on the availability of the content. The at least one content item can comprise a highest ranked content item of the ranking. In one aspect, the access element relevant to at least one content item is provided based a user context. The user context can comprise at least one of a user device, a user viewing history, timing information associated with a user, and user entitlement information. The access element can be provided to a first device. The access element can be configured to provide access to at least one of the at least one content item from the first device, the at least one content item from a second device, schedule a reminder to access the content item, and schedule a recording of a content item. The access element can comprise a resource locator configured to identify at least one location of the at least one content item. The access element can be configured to display a list of content available from the content provider. The access element can be configured to tune a set top box to the content item based on a user interaction. The access element can be configured to call an application programming interface configured to control a user device. The access element can comprise a link, window (e.g., viewing window), button, application, box, and/or the like. For example, the access element can comprise a list of resource locators, links, scripts configured to launch an application or open a window, and/or the like.

Figure 25:
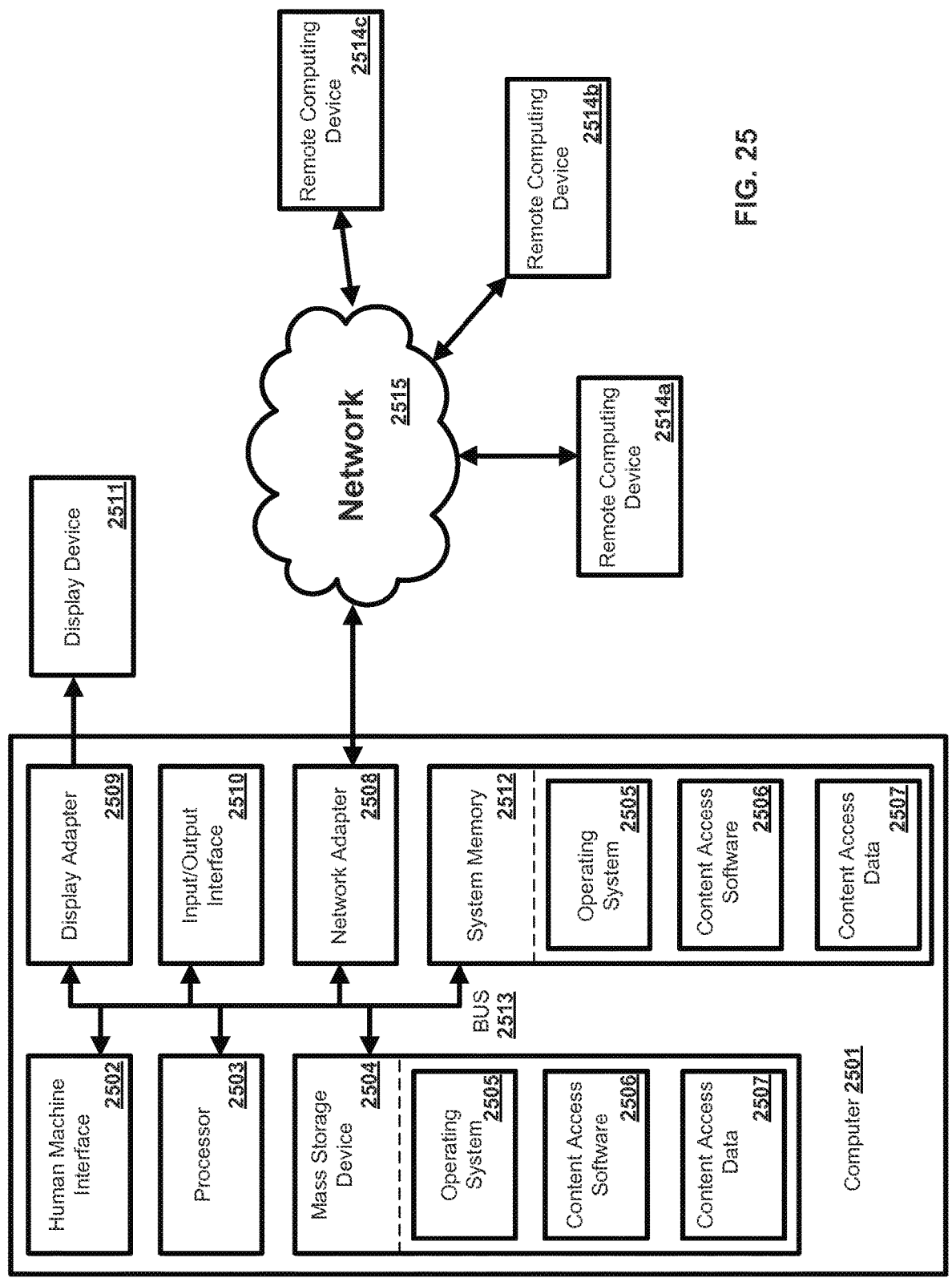
FIG. 25 is a block diagram of an example computing device in which various systems and methods of the disclosure can be implemented.

FIG. 25 is a block diagram illustrating an example computing system. In an exemplary aspect, the methods and systems can be implemented on a computer 2501 as illustrated in FIG. 25 and described below. By way of example, the content device 122, social media device 102, intermediary device 116, and/or user device 108 of FIG. 1 can be a computer as illustrated in FIG. 25. Similarly, the methods and systems disclosed can utilize one or more computers to perform one or more functions in one or more locations. FIG. 25 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 2501. The components of the computer 2501 can comprise, but are not limited to, one or more processors or processing units 2503, a system memory 2512, and a system bus 2513 that couples various system components including the processor 2503 to the system memory 2512. In the case of multiple processing units 2503, the system can utilize parallel computing.

The system bus 2513 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 2513, and all buses specified in this description can also be implemented over a wired or wireless network connection and each of the subsystems, including the processor 2503, a mass storage device 2504, an operating system 2505, content access software 2506, content access data 2507, a network adapter 2508, system memory 2512, an Input/Output Interface 2510, a display adapter 2509, a display device 2511, and a human machine interface 2502, can be contained within one or more remote computing devices 2514*a,b,c* at physically separate locations, connected through buses of this form, in effect implementing a fully distributed system.

The computer 2501 typically comprises a variety of computer readable media. Exemplary readable media can be any available media that is accessible by the computer 2501 and comprises, for example and not meant to be limiting, both volatile and non-volatile media, removable and non-removable media. The system memory 2512 comprises computer readable media in the form of volatile memory, such as random access memory (RAM), and/or non-volatile memory, such as read only memory (ROM). The system memory 2512 typically contains data such as content access data 2507 and/or program modules such as operating system 2505 and content access software 2506 that are immediately accessible to and/or are presently operated on by the processing unit 2503.

In another aspect, the computer 2501 can also comprise other removable/non-removable, volatile/non-volatile computer storage media. By way of example, FIG. 25 illustrates a mass storage device 2504 which can provide non-volatile storage of computer code, computer readable instructions, data structures, program modules, and other data for the computer 2501. For example and not meant to be limiting, a mass storage device 2504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 2504, including by way of example, an operating system 2505 and content access software 2506. Each of the operating system 2505 and content access software 2506 (or some combination thereof) can comprise elements of the programming and the content access software 2506. Content access data 2507 can also be stored on the mass storage device 2504. Content access data 2507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 2501 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 2503 via a human machine interface 2502 that is coupled to the system bus 2513, but can be connected by other interface and bus structures, such as a parallel port, game port, an IEEE 1394 Port (also known as a Firewire port), a serial port, or a universal serial bus (USB).

In yet another aspect, a display device 2511 can also be connected to the system bus 2513 via an interface, such as a display adapter 2509. It is contemplated that the computer 2501 can have more than one display adapter 2509 and the computer 2501 can have more than one display device 2511. For example, a display device can be a monitor, an LCD (Liquid Crystal Display), or a projector. In addition to the display device 2511, other output peripheral devices can comprise components such as speakers (not shown) and a printer (not shown) which can be connected to the computer 2501 via Input/Output Interface 2510. Any step and/or result of the methods can be output in any form to an output device. Such output can be any form of visual representation, including, but not limited to, textual, graphical, animation, audio, tactile, and the like. The display 2511 and computer 2501 can be part of one device, or separate devices.

The computer 2501 can operate in a networked environment using logical connections to one or more remote computing devices 2514*a,b,c*. By way of example, a remote computing device can be a personal computer, portable computer, smartphone, a server, a router, a network computer, a peer device or other common network node, and so on. Logical connections between the computer 2501 and a remote computing device 2514*a,b,c* can be made via a network 2515, such as a local area network (LAN) and/or a general wide area network (WAN). Such network connections can be through a network adapter 2508. A network adapter 2508 can be implemented in both wired and wireless environments. Such networking environments are conventional and commonplace in dwellings, offices, enterprise-wide computer networks, intranets, and the Internet.

For purposes of illustration, application programs and other executable program components such as the operating system 2505 are illustrated herein as discrete blocks, although it is recognized that such programs and components reside at various times in different storage components of the computing device 2501, and are executed by the data processor(s) of the computer. An implementation of content access software 2506 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow;

plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   receiving, by a computing device, based on an interaction with an interface element of a social media platform, user information, a user agnostic identifier, and timing information indicating a time that the interaction occurred, wherein the user agnostic identifier is associated with a content item;
   determining, based on the user agnostic identifier, the content item;
   determining, based on the timing information, an availability of the content item;
   determining, based on the user information, a content provider;
   providing, based on the availability of the content item, an access element configured to enable access to the content item via the content provider;
   receiving, from the content provider, based on a user associated with the user information accessing the content item, a notification; and
   tracking, based on the notification and at least the user information, behavior of the user associated with the user information.

2. The method of claim 1, further comprising accessing, based on the access element, the content item, wherein the access element comprises one or more of a link, a window, another interface element, or an application.

3. The method of claim 1, wherein receiving the user information and the user agnostic identifier is based on one or more of a user login or user tracking data.

4. The method of claim 1, wherein accessing the content item comprises one or more of an interaction with a playback control associated with the content item, sharing the content item, favoriting the content item, bookmarking the content item, commenting on the content item, reviewing the content item, or ranking the content item.

5. The method of claim 1, wherein tracking the behavior of the user associated with the user information comprises generating an event history associated with one or more of the user information or the user agnostic identifier.

6. The method of claim 1, further comprising determining, based on the notification, additional timing information indicating the user associated with the user information accessing the content item.

7. The method of claim 1, wherein tracking the behavior of the user associated with the user information comprises tracking a quantity of users accessing the content item.

8. A method, comprising:
   receiving, by a computing device, based on an interaction with an interface element of a social media platform, a user agnostic identifier and timing information indicating a time that the interaction occurred, wherein the user agnostic identifier is associated with a content item;
   determining, based on the user agnostic identifier, the content item;
   determining, based on the timing information, an availability of the content item;
   determining, based on the interaction, user information and a content provider;
   providing, based on the availability of the content item, an access element configured to enable access to the content item via the content provider;
   receiving, from the content provider, based on a user associated with the user information accessing the content item, a notification; and
   causing, based on the notification, a tracking service to determine consumption statistics associated with the content item and the user associated with the user information.

9. The method of claim 8, further comprising accessing, based on the access element, the content item, wherein the access element comprises one or more of a link, a window, another interface element, or an application.

10. The method of claim 9, wherein the user agnostic identifier is associated with a marketing campaign, the method further comprising accessing information indicative of the marketing campaign, wherein the information indicative of the marketing campaign is associated with the notification.

11. The method of claim 8, further comprising receiving, based on one or more of a user login or user tracking data, the user information.

12. The method of claim 8, wherein the interface element is associated with a social media feed.

13. The method of claim 8, wherein accessing the content item comprises one or more of an interaction with a playback control associated with the content item, sharing the content item, favoriting the content item, bookmarking the content item, commenting on the content item, reviewing the content item, or ranking the content item.

14. The method of claim 8, wherein accessing of the content item comprises an access of an advertisement associated with the content item.

15. The method of claim 8, further comprising determining, based on the notification, additional timing information indicating access of the content item.

16. A method, comprising:
   receiving, by a computing device, based on a plurality of interactions with one or more interface elements of a social media platform, a plurality of requests for a plurality of content items, a respective user agnostic identifier of a plurality of user agnostic identifiers associated with each interaction of the plurality of interactions, respective user information associated with each interaction of the plurality of interactions, and timing information indicating a respective time that each interaction of the plurality of interactions occurred, wherein the plurality of user agnostic identifiers are associated with the plurality of content items;
   determining, based on the respective user agnostic identifiers, the plurality of content items;
   determining, based on the timing information, a respective availability of each content item of the plurality of content items;
   determining, based on the respective user information associated with each interaction of the plurality of interactions, a plurality of content providers for the plurality of content items;
   providing, to a respective user device associated with the respective user information, based on the respective availability of a content item of the plurality of content items, an access element configured to enable access to the content item via a content provider of the plurality of content providers;

providing, to the respective user device associated with the respective user information, based on the respective availability of a content item of the plurality of content items, another access element configured to enable access to the content item via another content provider of the plurality of content providers;

receiving, from one or more content providers of the plurality of content providers or the another content provider, based on a user associated with the respective user information accessing the content item, a plurality of notifications; and tracking, based on the plurality of notifications, content item consumption behavior of the user associated with the respective user information.

17. The method of claim 16, wherein the user agnostic identifiers are associated with a marketing campaign.

18. The method of claim 17, further comprising associating, based on the plurality of notifications, the plurality of content items with the marketing campaign.

19. The method of claim 16, wherein accessing the content item comprises one or more of an interaction with a playback control associated with the content item, sharing the content item, favoriting the content item, bookmarking the content item, commenting on the content item, reviewing the content item, or ranking the content item.

20. The method of claim 16, further comprising associating, based on the plurality of notifications, one or more advertisements with the plurality of content items.

21. An apparatus, comprising:
one or more processors; and
a memory storing processor executable instructions that, when executed by the one or more processors, cause the apparatus to:
receive, based on an interaction with an interface element of a social media platform, user information, a user agnostic identifier, and timing information indicating a time that the interaction occurred, wherein the user agnostic identifier is associated with a content item;
determine, based on the user agnostic identifier, the content item;
determine, based on the timing information, an availability of the content item;
determine, based on the user information, a content provider;
provide, based on the availability of the content item, an access element configured to enable access to the content item via the content provider;
receive, from the content provider, based on a user associated with the user information accessing the content item, a notification; and
track, based on the notification and one or more of the user information, the user agnostic identifier, the access element, or the notification, behavior of the user associated with the user information.

22. The apparatus of claim 21, wherein the user agnostic identifier is associated with a marketing campaign.

23. The apparatus of claim 21, wherein the processor executable instructions that, when executed by the one or more processors, cause the apparatus to receive the user information and the user agnostic identifier, further cause the apparatus to receive, based on one or more of a user login or user tracking data, the user information and the user agnostic identifier.

24. The apparatus of claim 21, wherein accessing the content item comprises one or more of an interaction with a playback control associated with the content item, sharing the content item, favoriting the content item, bookmarking the content item, commenting on the content item, reviewing the content item, or ranking the content item.

25. The apparatus of claim 21, wherein the processor executable instructions that, when executed by the one or more processors, cause the apparatus to track the behavior of the user associated with the user information, further cause the apparatus to generate an event history associated with the user information and the user agnostic identifier.

26. The apparatus of claim 21, wherein the processor executable instructions, when executed by the one or more processors, further cause the apparatus to determine one or more advertisements associated with the content item.

\* \* \* \* \*